United States Patent
Lee et al.

(10) Patent No.: US 9,173,205 B2
(45) Date of Patent: Oct. 27, 2015

(54) METHOD AND BASE STATION FOR TRANSMITTING DOWNLINK SIGNAL AND METHOD AND EQUIPMENT FOR RECEIVING DOWNLINK SIGNAL

(75) Inventors: Moonil Lee, Anyang-si (KR); Jaehoon Chung, Anyang-si (KR); Hyunsoo Ko, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 13/816,760

(22) PCT Filed: Aug. 9, 2011

(86) PCT No.: PCT/KR2011/005783
§ 371 (c)(1),
(2), (4) Date: Apr. 22, 2013

(87) PCT Pub. No.: WO2012/020963
PCT Pub. Date: Feb. 16, 2012

(65) Prior Publication Data
US 2013/0208677 A1    Aug. 15, 2013

Related U.S. Application Data

(60) Provisional application No. 61/373,276, filed on Aug. 13, 2010.

(51) Int. Cl.
*H04W 72/04*    (2009.01)
*H04L 5/00*    (2006.01)
*H04W 24/10*    (2009.01)
*H04W 48/08*    (2009.01)

(52) U.S. Cl.
CPC ........ *H04W 72/0406* (2013.01); *H04L 5/0023* (2013.01); *H04L 5/0048* (2013.01); *H04L 5/0094* (2013.01); *H04W 24/10* (2013.01); *H04W 48/08* (2013.01)

(58) Field of Classification Search
CPC .. A61K 2300/00; H04B 7/024; H04L 5/0007; H04L 5/0048; H04L 5/0053; H04W 24/10; H04W 72/042
See application file for complete search history.

(56) References Cited

U.S. PATENT DOCUMENTS

| 2008/0260062 | A1 | 10/2008 | Imamura |
| 2010/0195615 | A1 | 8/2010 | Lee |
| 2011/0199986 | A1* | 8/2011 | Fong et al. ............. 370/329 |
| 2011/0274205 | A1 | 11/2011 | Lee et al. |
| 2012/0040696 | A1* | 2/2012 | Siomina et al. ......... 455/456.6 |

FOREIGN PATENT DOCUMENTS

| KR | 10-2010-0056962 A | 5/2010 |
| WO | 2010/087639 A2 | 8/2010 |

OTHER PUBLICATIONS

International Search Report issued in corresponding International Application No. PCT/KR2011/005783 dated Mar. 22, 2012.

* cited by examiner

*Primary Examiner* — Yong Zhou
(74) *Attorney, Agent, or Firm* — Morgan, Lewis & Bockius LLP

(57) ABSTRACT

A base station of the present invention configures resources in which a downlink signal is to be transmitted with zero power using resource sets defined for a specific number of antenna ports, regardless of the number of antenna ports actually configured in the base station, and transmits resource information indicating the configured resources to a user equipment. The user equipment of the present invention receives a downlink transmission from the base station, assuming that transmission power of resources corresponding to a resource set indicated by the resource information is zero.

15 Claims, 11 Drawing Sheets

: muted RE

: CSI-RS pattern i available for CSI-RS transmission

: CSI-RS pattern i used for CSI-RS transmission

METHOD AND BASE STATION FOR TRANSMITTING DOWNLINK SIGNAL AND METHOD AND EQUIPMENT FOR RECEIVING DOWNLINK SIGNAL

This is a U.S. National Phase Entry of PCT Application No. PCT/KR2011/005783, filed Aug. 9, 2011, and claims the benefit of U.S. Provisional Application No. 61/373,276 filed Aug. 13, 2010.

TECHNICAL FIELD

The present invention relates to a method and apparatus for transmitting/receiving a downlink signal, and more particularly, to a method and apparatus for configuring resources, in which a signal is to be transmitted with zero transmission power, i.e., resources to be muted, and a method and apparatus for transmitting/receiving information regarding the resources to be muted.

BACKGROUND ART

FIG. 1 illustrates a concept of a cellular wireless communication system.

A number of Base Stations (BSs) are configured so as to cover an entire region of a specific wireless communication system and each BS is configured so as to provide a specific wireless communication service to User Equipments (UEs) in a corresponding region. All BSs may provide the same communication service and may also provide different communication services. Recent multi-cell wireless communication systems are designed to allow a number of adjacent BSs to communicate with a UE using the same frequency band.

FIG. 2 illustrates a concept of a wireless communication system using multiple sectors in an independent cell.

As described above with reference to FIG. 1, each BS generally provides a communication service to a corresponding geographical region which can be divided into a plurality of smaller regions Cell 1, Cell 2, and Cell 3 in order to improve system performance. Each of the smaller regions may be referred to as a cell, a sector, or a segment. Signal interference may not only occur between cells belonging to different BSs as shown in FIG. 1 but may also occur between cells belonging to the same BS as shown in FIG. 2.

The overall performance of the wireless communication system may be reduced if the influence of interference caused by adjacent cells is not taken into consideration in the multi-cell system. For example, referring to FIG. 2, if a specific UE is located between BS1 and BS2, signals that the BS1 and BS2 transmit to the specific UE using the same frequency band affect the specific UE at similar strengths. A downlink signal of the BS1 and a downlink signal of the BS2 cause interference to each other. If a communication system is configured without taking into consideration the influence of such interference, there is a problem in that it is not possible to optimize system throughput since channel state information (also referred to as channel quality information) that the UE feeds back to the BS is incorrect.

As a result, in order to optimize throughput of such a communication system, it is important to configure a communication system so as to allow the UE to correctly measure a channel state between an adjacent cell and the UE and/or to correctly measure a channel state of a serving cell taking into consideration the level of interference caused by adjacent cells.

DISCLOSURE OF INVENTION

Technical Problem

Accordingly, there is a need to provide a method for minimizing the influence of inter-cell interference and a method for increasing the accuracy of measurement of a channel state of each cell and/or measurement of interference of an adjacent cell exerted upon each cell.

Objects of the present invention are not limited to those described above and other objects will be clearly understood by those skilled in the art from the following detailed description of the present invention.

Solution to Problem

A transmission device of the present invention configures resources in which a signal is to be transmitted with zero power using resource sets defined for a specific number of antenna ports, regardless of the number of antenna ports actually configured in the transmission device, and transmits resource information indicating the configured resources to a reception device. The reception device of the present invention receives a signal transmission from the transmission device, assuming that transmission power of resources corresponding to a resource set indicated by the resource information is zero.

In more detail, in an aspect of the present invention, a method for transmitting a downlink signal from a Base Station (BS) in a wireless communication system in which resource sets for a reference signal for channel measurement are defined according to the number of antenna ports is provided. The method comprises: configuring a zero transmission power region in a resource region including a plurality of resources; transmitting resource information indicating the zero transmission power region to a User Equipment (UE); and performing downlink transmission to the UE in the resource region, wherein the zero transmission power region is configured with at least one of a plurality of resource sets defined for reference signal transmission for channel measurement for a specific number of antenna ports regardless of the number of antenna ports configured in the BS, and wherein transmission power for resources corresponding to the zero transmission power region is zero.

In another aspect of the present invention, a method for receiving a downlink signal by a User Equipment (UE) in a wireless communication system in which resource sets for a reference signal for channel measurement are defined according to the number of antenna ports is provided. The method comprises: receiving resource information indicating a zero transmission power region in a resource region including a plurality of resources from a Base Station (BS); and receiving a downlink transmission from the BS in the resource region, wherein the zero transmission power region is configured with at least one of a plurality of resource sets defined for reference signal transmission for channel measurement for a specific number of antenna ports regardless of the number of antenna ports configured in the BS, and wherein the UE receives the downlink transmission, assuming based on the resource information that transmission power of resources corresponding to the zero transmission power region is zero.

In a further aspect of the present invention, a Base Station (BS) for transmitting a downlink signal in a wireless communication system in which resource sets for a reference signal for channel measurement are defined according to the number of antenna ports is provided. The BS comprises: a transmitter; and a processor electrically connected to the transmitter and configured to control the transmitter, wherein the processor configures a zero transmission power region in a resource region including a plurality of resources, controls the transmitter to transmit resource information indicating the zero transmission power region to a User Equipment (UE), and controls the transmitter to perform downlink transmission to the UE in the resource region, wherein the processor configures the zero transmission power region using at least one of a plurality of resource sets defined for reference signal transmission for channel measurement for a specific number of antenna ports regardless of the number of antenna ports configured in the BS, and wherein the processor controls the transmitter to perform the downlink transmission at zero transmission power on resources corresponding to the zero transmission power region.

In still another aspect of the present invention, a User Equipment (UE) for receiving a downlink signal in a wireless communication system in which resource sets for a reference signal for channel measurement are defined according to the number of antenna ports is provided. The UE comprises: a receiver; and a processor electrically connected to the receiver and configured to control the receiver, wherein the processor controls the receiver to receive resource information indicating a zero transmission power region in a resource region including a plurality of resources from a Base Station (BS), and controls the transmitter to receive a downlink transmission from the BS in the resource region, wherein the zero transmission power region is configured with at least one of a plurality of resource sets defined for reference signal transmission for channel measurement for a specific number of antenna ports regardless of the number of antenna ports configured in the BS, and wherein the processor is configured so as to assume based on the resource information that transmission power of resources corresponding to the zero transmission power region is zero.

In each aspect of the present invention, the resource information may include a plurality of bits corresponding respectively to the plurality of resource sets defined for the specific number of antenna ports, and a bit corresponding to a resource set included in the zero transmission power region among the plurality of bits may be set to a first value and a bit corresponding to a resource set that is not included in the zero transmission power region may be set to a second value.

In each aspect of the present invention, the resource sets defined in the wireless communication system may include at least first resource sets defined for reference signal transmission for channel measurement for N1 antenna ports and second resource sets defined for reference signal transmission for channel measurement for N2 antenna ports, wherein N2 is greater than N1, and the specific number may be N2.

The above-described technical solutions are only part of the embodiments of the present invention and those having ordinary knowledge in the art will be able to derive and understand various embodiments incorporating technical features of the present invention from the detailed description of the present invention.

Advantageous Effects of Invention

According to the present invention, it is possible to efficiently configure resources for channel measurement and/or interference measurement.

In addition, it is possible to reduce overhead required for transmission of information indicating muted resources.

Advantages of the present invention are not limited to those described above and other advantages will be clearly understood by those skilled in the art from the following detailed description of the present invention.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
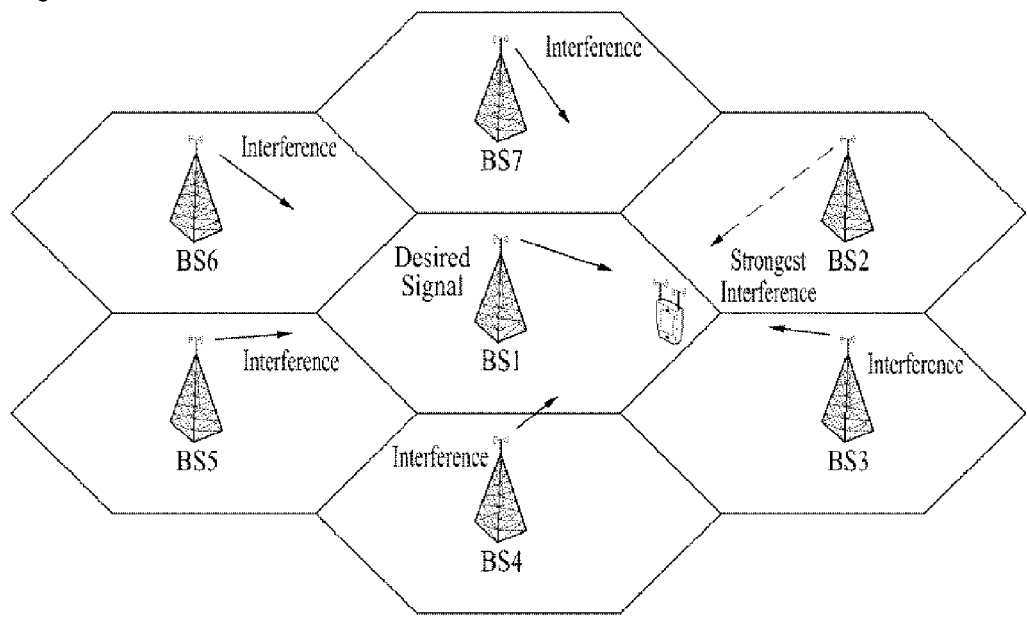
FIG. 1 illustrates a concept of a cellular wireless communication system.
Figure 2:
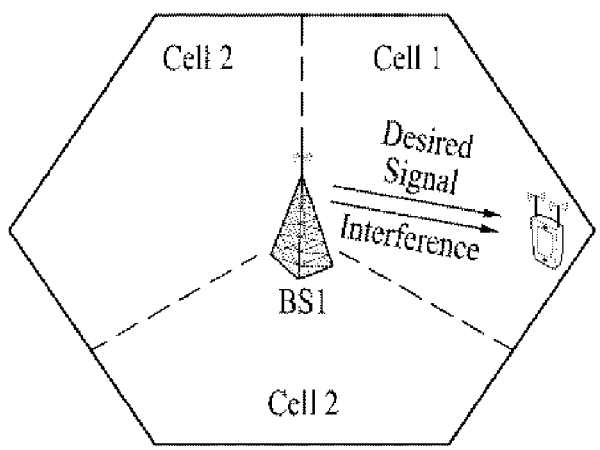
FIG. 2 illustrates a concept of a wireless communication system using multiple sectors in an independent cell.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

In the present invention, the term "User Equipment (UE)" refers to any of various devices that may be stationary or mobile and may communicate with a BS to transmit and receive user data and/or various control information to and from the BS. The UE may also be referred to as a terminal equipment, a mobile station (MS), a mobile terminal (MT), a user terminal (UT), a subscriber station (SS), a wireless device, a personal digital assistant (PDA), a wireless modem, or a handheld device. In addition, in the present invention, the term "Base station (BS)" generally refers to a fixed station that communicates with a UE and/or another BS to exchange various data and control information. The BS may also be referred to by other terms such as an evolved-NodeB (eNB), a base transceiver system (BTS), or an access point (AP).

In the present invention, the term "cell" refers to a geographical region to which a BS or an antenna group provides a communication service. Thus, when it is said that an entity communicates with a specific cell, it means that the entity communicates with an antenna group that provides a communication service to the specific cell. The term "downlink/uplink signal of a specific cell" refers to a downlink/uplink signal with respect to an antenna group that provides a communication service to the specific cell. The term "channel state/quality of a specific cell" refers to a channel state/quality of a communication link or a channel established between a UE and an antenna group that provides a communication service to the specific cell. In the present invention, when it is said that a specific signal is allocated to a frame, subframe, slot, carrier, or subcarrier, this means that the specific signal is transmitted through the carrier or subcarrier during a period or timing of the frame, subframe, slot, or symbol.

In addition, in the present invention, the term "resource element (RE)" refers to the minimum time-frequency resource unit which includes an OFDM symbol and a subcarrier. The RE may also be referred to as a tone. An RE in which a reference signal is transmitted is referred to as an RS RE and an RE in which control information or data is transmitted is referred to as a data RE.

In the present invention, the term "frame" refers to a structured data sequence that has a fixed duration used in some physical (PHY) layer standards. One frame may include one or more subframes which are basic units of Transmission Time Intervals (TTIs). Generally, a basic TTI is set as one subframe. The term "TTI" refers to a time interval in which an encoded packet is transmitted through a radio interface in the physical layer. Thus, the TTI may be used when one subframe or a plurality of adjacent subframes transmits a data packet. The subframe may include a plurality of OFDM symbols in the time domain and include a plurality of subcarriers in the frequency domain.

Hereinafter, if no signal is transmitted within a frame, subframe, a slot, a symbol, a carrier, a subcarrier, or a resource element, it may be said that the frame, subframe, slot, symbol, carrier, subcarrier, or resource element has been muted, nulled, or blanked. For example, if a transmitter has set the transmission power of a specific resource unit (also referred to as a specific resource) to zero, it may be said that the transmitter has muted, nulled, or blanked the specific resource unit. That is, the transmitter does not transmit any signal through muted, nulled, or blanked resources.

The embodiments of the present invention can be supported by the standard documents disclosed in at least one of the wireless access systems including an Institute of Electrical and Electronics Engineers (IEEE) 802 system, a 3rd Generation Partnership Project (3GPP) system, a 3GPP Long Term Evolution (LTE) system, a 3GPP LTE-Advanced (LTE-A) system, and a 3GPP2 system. That is, the steps or portions, which are not described in order to make the technical spirit of the present invention clear, may be supported by the standard documents. In addition, all terms disclosed in the present document can be explained by the above standard documents.

Techniques, apparatuses and systems described in the following can be used in various wireless access systems. Examples of the various wireless access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system. CDMA may be implemented with a radio technology such as Universal Terrestrial Radio Access (UTRA) or CDMA2000. TDMA may be implemented with a radio technology such as Global System for Mobile communications (GSM), General Packet Radio Service (GPRS), or Enhanced Data rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802.20, or Evolved-UTRA (E-UTRA). UTRA is a part of Universal Mobile Telecommunication System (UMTS) and 3rd Generation Partnership Project (3GPP) Long Term Evolution (LTE) is a part of Evolved-UMTS (E-UMTS) that uses E-UTRA. 3GPP LTE employs OFDMA for downlink and employs SC-FDMA for uplink. LTE-Advanced (LTE-A) is an evolved version of 3GPP LTE. For ease of explanation, the present invention will hereinafter be described mainly using terms used in the 3GPP LTE/LTE-A. However, technical features of the present invention are not limited to the 3GPP LTE/LTE-A system. For example, although the following description will be given based on a mobile communication system corresponding to the 3GPP LTE/LTE-A system, the following description can be applied to other mobile communication systems, excluding unique features of the 3GPP LTE/LTE-A system.

<Reference Signal (RS)>

Various RSs are transmitted between the BS and UE for the purposes such as alleviation of interference, estimation of a channel state between the BS and UE, and demodulation of a signal transmitted between the BS and the UE. The RS is a signal which has a predefined special waveform known to both the BS and UE and which is transmitted from the BS to the UE or from the UE to the BS. The RS is also referred to as a pilot.

RSs may be mainly classified into a dedicated RS (DRS) and a common RS (CRS). RSs may also be mainly classified into an RS for demodulation and an RS for channel measurement. The CRS and the DRS may also be referred to as a cell-specific RS and a demodulation RS (DMRS). The DMRS may also be referred to as a UE-specific RS.

The CRS is an RS that can be used for both demodulation and measurement purposes and is common to all UEs in the cell. On the other hand, the DRS is generally used only for demodulation purposes and can be used only by a specific UE.

In the case of CRS based downlink transmission, the BS transmits a CRS for channel estimation between the UE and the BS and a DRS for demodulation of a layer while transmitting the layer to the UE. The CRS sequence is transmitted through all antenna ports regardless of the number of layers. The CRS is transmitted in all subframes that support downlink transmission since the CRS is used for both demodulation and measurement purposes. Accordingly, CRS based downlink transmission increases overall RS overhead as the number of physical antenna ports increases, thereby reducing data transmission efficiency.

In order to overcome this problem, the present invention suggests that an RS for modulation and an RS for channel measurement be discriminately used instead of using a CRS which increases transmission overhead as the number of antenna ports increases since it is used for both channel estimation and data demodulation.

The UE may measure a channel state/quality of a corresponding cell using an RS for channel measurement and may demodulate downlink data transmitted to the UE using an RS for demodulation.

<RS for Channel Measurement>

In the following, the present invention suggests a method for configuring an RS for channel estimation so as to measure a channel state of each cell and/or interference of an adjacent cell caused to each cell while minimizing inter-cell interference and a method for measuring channel state and/or interference using such RS for channel estimation. In the following description of embodiments of the present invention, the RS for channel estimation is referred to as a channel state information RS (CSI-RS).

The variation of channel state with time is not relatively great. Data throughput decreases as RS overhead increases since resources used for RS transmission cannot be used for data transmission. Taking into consideration this fact, a CSI-RS is configured so as to be transmitted at intervals of a predetermined period spanning a plurality of subframes, unlike a CRS that is configured so as to be transmitted every subframe. In this case, there is an advantage in that CSI-RS transmission overhead may be greatly reduced compared to CRS transmission overhead. Accordingly, in the present invention, the BS transmits CSI-RS(s) to a UE located in a cell, to which the BS transmits a communication service, at intervals of a transmission period spanning a plurality of subframes rather than every subframe.

The BS transmits a CSI-RS or CSI-RSs through a specific antenna group including one or more antennas belonging to the BS at intervals of the CSI-RS transmission period in order for a UE to measure a channel established with the specific antenna group. A UE, which receives a communication signal from the specific antenna group, may receive a CSI-RS transmitted from each antenna port in the specific antenna group and then estimate/measure state/quality of a channel established between the specific antenna group and the UE. The UE may feed channel state information indicating the result of the channel measurement back to the BS.

In the following description, the term "CSI-RS resource" or "CSI-RS RE" refers to an RE that can be allocated or is available for CSI-RS transmission. A symbol/carrier/subcarrier to which a CSI-RS is allocated is referred to as a CSI-RS symbol/carrier/subcarrier. For example, a symbol to which a CSI-RS is allocated is referred to as a CSI-RS symbol and a subcarrier to which a CSI-RS is allocated is referred to as a CSI-RS subcarrier. A subframe in which CSI-RS transmission is configured is referred to as a CSI-RS subframe. A subframe in which a muted resource is configured is referred to as a muting subframe.

In addition, an antenna port transmitting a CSI-RS from among the antenna port(s) of the BS is referred to as a CSI-RS antenna port. A BS including N, antenna ports may configure up to N, CSI-RS ports for CSI-RS transmission. All antenna ports in the BS become CSI-RS antenna ports when all the antenna ports transmit a CSI-RS and a specific antenna port becomes a CSI-RS antenna when the specific antenna port transmits a CSI-RS/DRS. Each CSI-RS port transmits a corresponding CSI-RS through a corresponding time-frequency resource (or resource unit).

The BS may transmit one or more CSI-RSs through one or more antenna ports in a cell-specific manner and the UE may measure a channel of the cell by receiving the CSI-RS(s) of the cell. The UE may feed channel state information indicating a result of the channel measurement back to the BS.

CSI-RS positions of adjacent cells should not overlap in order to prevent collision of CSI-RSs transmitted between multiple cells and to prevent a CSI-RS to be transmitted by each cell from being dropped due to resource muting. Accordingly, it is desirable that resources to which CSI-RSs of adjacent cells are allocated be orthogonal to each other. Such CSI-RS orthogonality may also be achieved by mapping CSI-RSs transmitted by adjacent cells to radio resources so as to prevent the CSI-RSs transmitted by adjacent cells from overlapping in any time/frequency resource region. In the following description, a resource position or a set of resources in a specific resource region (for example, a resource block pair) in which CSI-RS port(s) configured by the BS transmit CSI-RS(s) will be referred to as a CSI-RS pattern. For reference, the CSI-RS pattern will also be referred to as a CSI-RS configuration.

Figure 3:
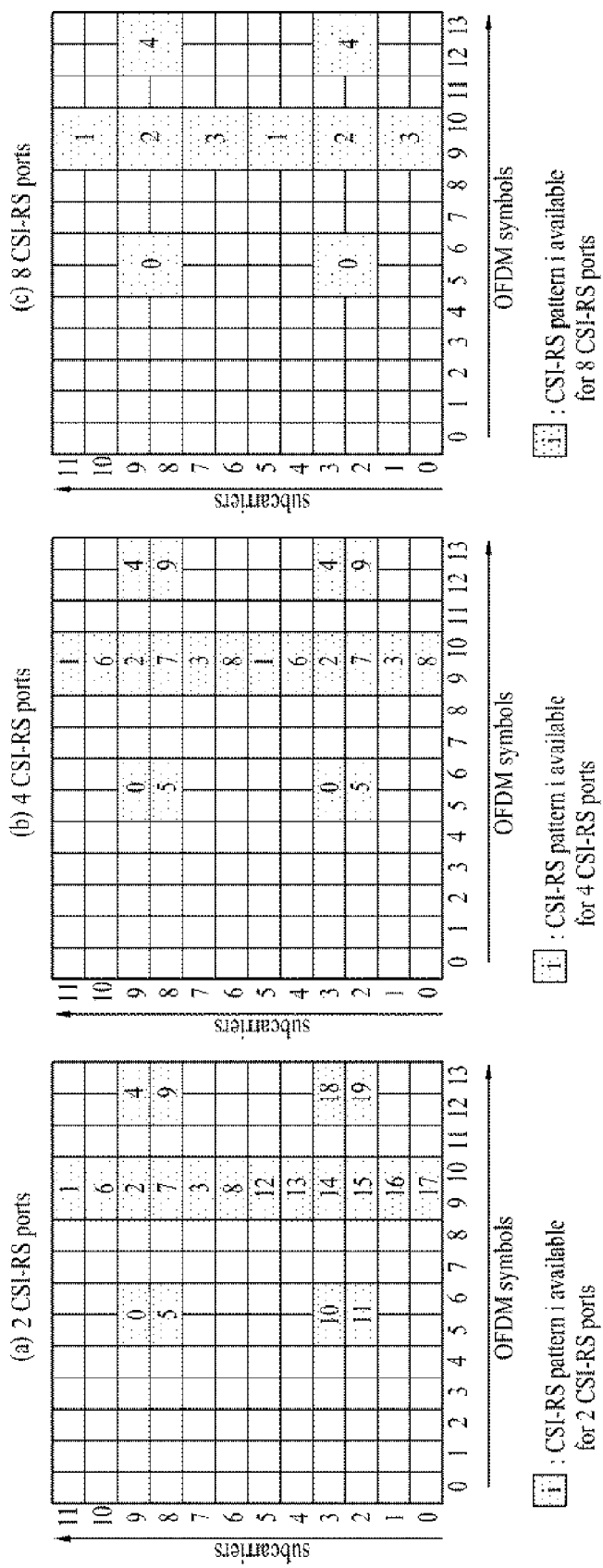
FIG. 3 illustrates a CSI-RS pattern.

FIG. 3 illustrates a CSI-RS pattern. For ease of explanation, it is assumed that the BS may configure up to 8 CSI-RS ports. In addition, although it is assumed in FIG. 3 that a CSI-RS pattern is defined in a resource region including 12 subcarriers and 14 OFDM symbols, the number of subcarriers and OFDM symbols included in the resource region in which the CSI-RS pattern is defined may vary depending on the mobile communication system.

Specifically, FIG. 3(a) illustrates 20 CSI-RS patterns that are available for CSI-RS transmission through 2 CSI-RS ports, FIG. 3(b) illustrates 10 CSI-RS patterns that are available for CSI-RS transmission through 4 CSI-RS ports, and FIG. 3(c) illustrates 5 CSI-RS patterns that are available for CSI-RS transmission through 8 CSI-RS ports. A respective number may be assigned to each CSI-RS pattern defined according to the number of CSI-RS ports.

When the BS configures 2 antenna ports for RS transmission for channel measurement, i.e., when the BS configures 2 CSI-RS ports, the 2 CSI-RS ports transmit CSI-RSs on radio resources belonging to one of the 20 CSI-RS patterns shown in FIG. 3(a). When the BS configures 4 CSI-RS ports for a specific cell, the 4 CSI-RS ports transmit CSI-RSs on a CSI-RS pattern configured for the specific cell from among the CSI-RS patterns shown in FIG. 3(b). Similarly, when the BS configures 8 CSI-RS ports for a specific cell, the 8 CSI-RS ports transmit CSI-RSs on a CSI-RS pattern configured for the specific cell from among the 5 CSI-RS patterns shown in FIG. 3(c).

In a multi-cell system, BS(s) of adjacent cells that participate in channel measurement and/or channel interference measurement may prevent collision of CSI-RS transmission by configuring different CSI-RS patterns for the adjacent cells. In the following description, a set of cells that participate in channel measurement and/or interference measurement is referred to as an estimation set. Here, it is preferable that CSI-RS patterns whose time-frequency resources do not overlap be assigned to cells in a specific estimation set.

To receive a CSI-RS transmitted by the BS and to perform channel measurement using the CSI-RS, the UE needs to be aware of a resource through which the CSI-RS is transmitted. That is, to detect a CSI-RS that the BS of the serving cell transmits on a CSI-RS pattern, it is necessary for the UE to know the CSI-RS pattern of the serving cell. Accordingly, the BS transmits CSI-RS configuration information specifying the CSI-RS pattern to UE or UEs within the coverage of the BS.

<Resource Muting>

On the other hand, in order to allow the UE to more correctly measure a channel state of a specific cell (or a specific antenna group transmission point), cells adjacent to the specific cell may not transmit a signal through a CSI-RS subcarrier in an OFDM symbol in which a CSI-RS is transmitted in the specific cell. This is referred to as resource muting, RE muting, or time-frequency resource muting. If a specific resource is muted in a specific cell, there is an advantage in that the specific cell has no influence upon channel estimation and/or interference measurement that the UE performs through the specific resource since a downlink signal of the specific cell is not transmitted to the UE through the specific resource. That is, it is possible to exclude the influence of a signal transmitted through the specific cell in the channel measurement and/or interference measurement procedure.

Resource muting is generally used to mute, in the serving cell, the same data RE as that of a CSI-RS pattern of an adjacent cell, which is to be estimated, to allow a CSI-RS transmitted from the adjacent cell to be detected without interference caused by a data signal of the serving cell. Accordingly, resource muting is generally applied to REs allocated to CSI-RS(s) of other cell(s).

To perform correct channel measurement and interference measurement, it is necessary for the UE to be aware of which radio resource is muted. In order to correctly demodulate received data, the receiving end generally performs rate matching to collect actual data REs from among REs in the data region. When a CSI-RS has been configured or resource muting has been configured, the UE handles the muted REs and the CSI-RS REs from among REs in the corresponding subframe as non-data REs in the rate matching procedure. Accordingly, even when resources muted by the serving cell are not resources through which an adjacent cell transmits a CSI-RS, the UE needs to know which radio resource has been muted in order to correctly demodulate received data. Since the UE receives, from the BS, information regarding the CSI-RS pattern of a cell (i.e., the serving cell) in which the UE is located, it is possible for the UE to determine a CSI-RS pattern through which a CSI-RS for measurement of the channel between the UE and the BS is to be transmitted. However, since the UE generally does not know a CSI-RS pattern used by an adjacent cell, there is a problem in that it is difficult to determine which resource is to be muted by the BS of the serving cell. Accordingly, it is desirable that the BS transmit, to the UE, information indicating a radio resource which is to be muted by the serving cell of the UE. This information will hereinafter be referred to as muting configuration information or muting pattern information.

Thus, downlink overhead for transmission of muting configuration information inevitably occurs in the case where the BS supports resource muting. Accordingly, there is a need to provide a method for efficiently transmitting muting configuration information, which is a kind of control information, from the BS to the UE.

<Muting Pattern>

If the BS can arbitrarily select and mute radio resources in a specific resource region, overhead for transmitting information specifying an arbitrarily selected muting resource to the UE is very great. Accordingly, it is preferable to predefine a set of radio resources that can be muted. In the following description, a resource position or a resource set, through which all antenna ports of a serving cell (or serving BS) transmit a signal with zero transmission power (i.e., transmit no signal) in a specific resource region (for example, a resource block pair of the 3GPP LTE standard or a tile according to the IEEE 802.16 standard), is referred to as a muting pattern or an RE mapping pattern. When resource muting of the serving cell is configured, there is a high possibility that the BS will mute the same data RE as a CSI-RS pattern of an adjacent cell to be estimated. Accordingly, it is desirable that the muting pattern be configured taking into consideration the CSI-RS pattern. In the following, embodiments of the present invention of transmission of muting configuration information from the BS are described assuming that the muting pattern is configured based on the CSI-RS patterns of FIG. 3.

First Embodiment

Bitmap-Based Muting Configuration

In the first embodiment of the present invention, different CSI-RS patterns are freely allocated to cells belonging to an estimation set. That is, as long as the cells belonging to the estimation set and the corresponding CSI-RS patterns are in one-to-one correspondence, the same number of CSI-RS patterns as the cells belonging to the estimation set may be arbitrarily selected from among the predefined CSI-RS patterns. The BS may mute CSI-RS patterns other than CSI-RS patterns to be used for CSI-RS transmission to a specific coverage and may signal the muted CSI-RS patterns among the predefined CSI-RS patterns to the UE using a bitmap. For example, when the total number of CSI-RS patterns that can be selected by the BS is n, the BS can transmit muted CSI-RS patterns among the n CSI-RS patterns to the UE using an n-bit bitmap. Assuming that the number of CSI-RS ports is separately signaled to the UE, referring to FIG. 3(a), it is possible to configure, as muting configuration information, a bitmap including 20 bits corresponding respectively to 20 CSI-RS patterns since the total number of CSI-RS patterns for 2 CSI-RS ports is 20. Referring to FIG. 3(b), it is possible to configure, as muting configuration information, a bitmap including 10 bits corresponding respectively to 10 CSI-RS patterns since the total number of CSI-RS patterns for 4 CSI-RS ports is 10, and, referring to FIG. 3(c), it is possible to configure, as muting configuration information, a bitmap including 5 bits since the total number of CSI-RS patterns for 8 CSI-RS ports is 4.

Figure 4:
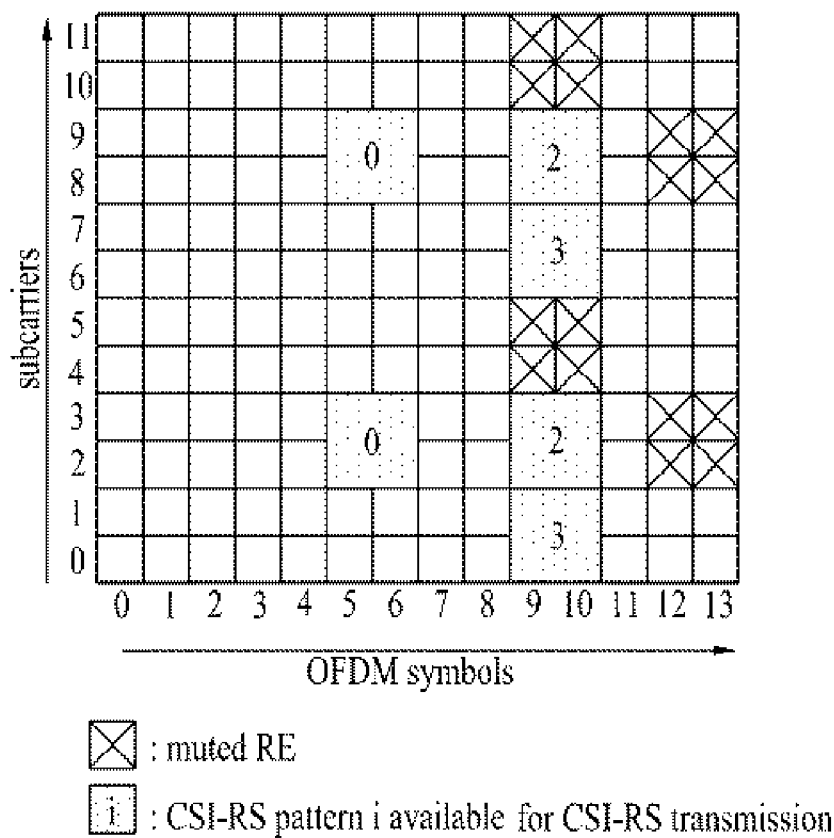
FIG. 4 illustrates resource muting and a muting configuration information according to the first embodiment of the present invention.

FIG. 4 illustrates resource muting and muting configuration information according to the first embodiment of the present invention. Specifically, FIG. 4 shows muting configuration information that the BS can transmit to the corresponding coverage when 8 CSI-RS ports are configured in the BS.

Referring to FIGS. 3(c) and 4, the BS of the serving cell may determine a CSI-RS pattern to be muted through negotiation with a BS of an adjacent cell that causes a strong interference signal to the serving cell or receives strong interference by a signal from the serving cell. For example, in the case where CSI-RSs of cells adjacent to the serving cell to which the BS needs to transmit a CSI-RS are transmitted through a CSI-RS pattern 1 and a CSI-RS pattern 4, the base station of the serving cell may configure a muting pattern so as to mute REs belonging to the CSI-RS pattern 1 and the CSI-RS pattern 4. In order to indicate the muting pattern, the BS may transmit a bitmap including 5 bits "01001" in which bits corresponding to the CSI-RS pattern 1 and the CSI-RS pattern 4 are set to "1" and the remaining bits are set to "0".

In the case where a UE has received a bitmap set to "01001" from a BS, the UE performs interference measurement and/or rate matching, assuming that the BS has not transmitted a signal through REs belonging to the CSI-RS pattern 1 and the CSI-RS pattern 4. That is, when measuring interference, the UE may handle a signal detected through the CSI-RS pattern 1 and the CSI-RS pattern 4 as an interference signal or noise. The UE may exclude a signal detected through REs belonging to the CSI-RS pattern 1 and the CSI-RS pattern 4 from data to be demodulated in the rate matching procedure, assuming that the REs belonging to the CSI-RS pattern 1 and the CSI-RS pattern 4 are not data REs. The UE handles, as data REs, REs belonging to the CSI-RS pattern 0, the CSI-RS pattern 2, and the CSI-RS pattern 3 which have been set to "0" in the bitmap unless the REs belonging to the CSI-RS pattern 0, the CSI-RS pattern 2, and the CSI-RS pattern 3 are used for transmission of a different type of RS or a synchronous signal. For example, in the case where the BS configures 2 CSI-RS ports and uses the CSI-RS pattern 2 of FIG. 3(a) for CSI-RS transmission, the UE may handle, as data REs, REs other than REs belonging to the CSI-RS pattern 2 of FIG. 3(a) from among the CSI-RS pattern 0, the CSI-RS pattern 2, and the CSI-RS pattern 3 which have been set to 0 in the bitmap. For reference, the UE may handle a signal received through the CSI-RS pattern 2 of FIG. 3(a) as a CSI-RS and may perform channel measurement using the CSI-RS.

In the case where a muting pattern is signaled using a bitmap, there is an advantage in that the BS can configure various muting patterns. The number of CSI-RS patterns that the BS mutes varies depending on the number of adjacent cells belonging to an estimation set. In the case where no adjacent cell is included in the estimation set or the serving cell has little influence upon adjacent cells, the BS may not configure resource muting. In addition, the BS may configure resource muting so as to mute all resources covered by CSI-RS patterns defined in a wireless communication system to which the BS belongs.

In the case where a total of n CSI-RS patterns are predefined, the number of resource muting patterns that can be configured by the BS may be expressed as follows, including the case in which no CSI-RS pattern is muted.

MathFigure 1

$$\sum_{i=0}^{n} \binom{n}{i}$$ [Math. 1]

However, if a CSI-RS and muting are configured in the same subframe, a CSI-RS pattern used for CSI-RS transmission of the serving cell needs to be excluded from muting and therefore the number of resource muting patterns that the BS can configure in the subframe may be expressed as follows.

MathFigure 2

$$\sum_{i=0}^{n-1} \binom{n}{i}$$ [Math. 2]

Signaling of muting configuration information using a bitmap has an advantage in that resource muting can be completely flexibly configured. However, since the number of bits of the bitmap is proportional to the number of CSI-RS patterns, muting configuration information transmission using a bitmap has a higher signaling overhead for rate mating and resource mapping than that of the second and third embodiments described below.

Second Embodiment

Tree-Based Muting Configuration

In the second embodiment of the present invention, a muting pattern is configured by muting consecutive CSI-RS patterns from among predefined CSI-RS patterns. A BS which participates in channel measurement and/or interference measurement cooperates with an adjacent BS which participates in the channel measurement and interference measurement to allow the adjacent BS to transmit a CSI-RS of the adjacent CSI-RS within resources belonging to the muted CSI-RS patterns.

Figure 5:
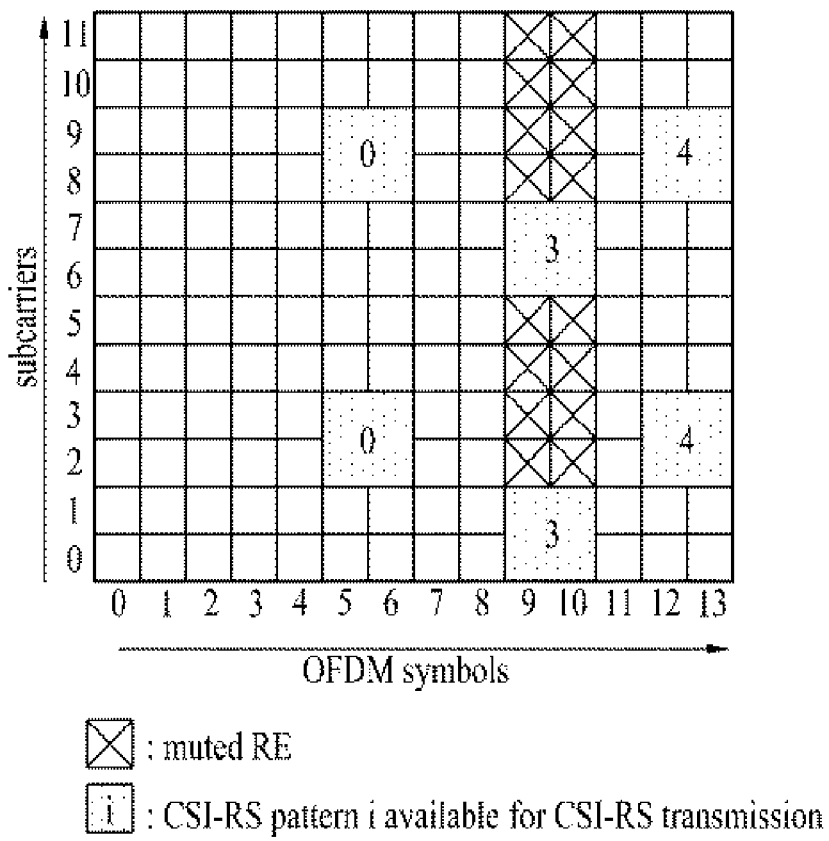
FIG. 5 illustrates resource muting and a muting configuration information according to the second embodiment of the present invention.

FIG. 5 illustrates resource muting and muting configuration information according to the second embodiment of the present invention.

All muted CSI-RS patterns may be notified to the UE through tree-based signaling. For example, the BS may be configured to configure a muting pattern by muting consecutive CSI-RS patterns.

Referring to FIG. 5, in the case where the BS mutes a range of CSI-RS patterns from CSI-RS pattern 1 to CSI-RS pattern 2, the BS may transmit muting configuration information corresponding to the starting CSI-RS pattern 1 and the ending CSI-RS pattern 2 to the UE.

By receiving the muting configuration information, a UE located in the coverage of the BS can determine that REs belonging to the range of CSI-RS patterns from the CSI-RS pattern 1 to the CSI-RS pattern 2 are muted. The UE performs rate matching, assuming that the BS transmits no signal through the REs belonging to the range of CSI-RS patterns from the CSI-RS pattern 1 to the CSI-RS pattern 2. That is, the UE assumes that transmission powers of the REs belonging to the range of CSI-RS patterns from the CSI-RS pattern 1 to the CSI-RS pattern 2 are zero. Accordingly, the REs belonging to the CSI-RS pattern 1 and the CSI-RS pattern 2 are handled as non-data REs in the rate matching procedure. The REs belonging to the CSI-RS pattern 1 and the CSI-RS pattern 2 may also be used for CSI-RS transmission of an adjacent cell.

Figure 6:
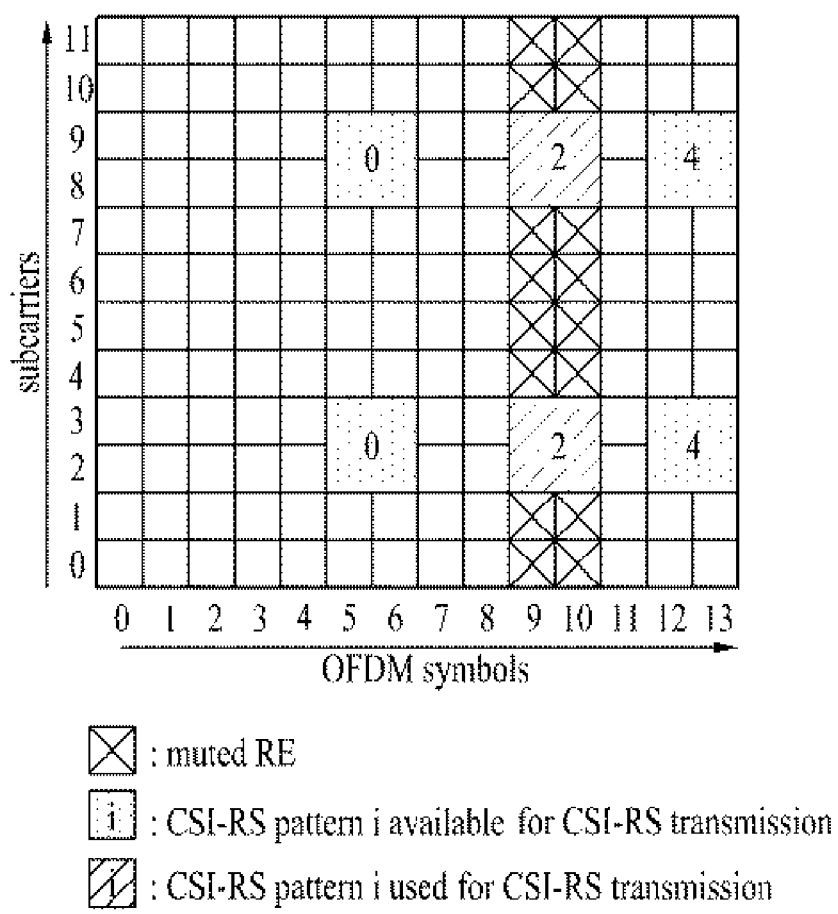
FIG. 6 illustrates another example of resource muting and muting configuration information according to the second embodiment of the present invention.

FIG. 6 illustrates another example of resource muting and muting configuration information according to the second embodiment of the present invention.

A wireless communication system may be configured so as to allow cells belonging to a specific estimation set to use consecutive CSI-RS patterns. In this case, BS(s) that participate in channel measurement and/or interference measurement may select a starting CSI-RS pattern and an ending CSI-RS pattern for cells belonging to the estimation set to perform CSI-RS configuration for the channel measurement and/or interference measurement. The serving BS may transmit, to the UE, muting pattern information corresponding to the starting CSI-RS pattern and the ending CSI-RS pattern and the CSI-RS pattern used for CSI-RS transmission of the serving cell.

For example, let us assume that the BS configures CSI-RS transmission using consecutive CSI-RS patterns 1, 2, and 3 while the BS mutes the CSI-RS patterns 1 and 3 and uses the CSI-RS pattern 2 for CSI-RS transmission in a specific subframe. In this case, referring to FIG. 6, the BS may transmit muting configuration information specifying that the CSI-RS pattern 1 is a starting CSI-RS pattern and the CSI-RS pattern 3 is an ending CSI-RS pattern. In addition, the BS may transmit CSI-RS pattern information indicating that the CSI-RS pattern 2 is used for CSI-RS transmission of the BS to a UE within the corresponding coverage. The CSI-RS pattern 1 and the CSI-RS pattern 3 may be used for CSI-RS transmission of another cell that is adjacent to a cell in which the UE to which the muting configuration information and the CSI-RS pattern information are transmitted is located.

The UE, which has received the muting configuration information and the CSI-RS pattern information, can determine that a signal received through the CSI-RS patterns 1 and 3 is excluded from data in the rate matching and RE mapping procedures. Based on the muting configuration information and the CSI-RS pattern information, the UE assumes that no downlink signal is transmitted through the CSI-RS pattern 1 and the CSI-RS pattern 3 and a CSI-RS of the BS is transmitted through the CSI-RS pattern 2. That is, the UE assumes that the BS performs transmission through resources corresponding to the CSI-RS pattern 1 and the CSI-RS pattern 3 with zero transmission power and performs transmission through resources corresponding to the CSI-RS pattern 2 with non-zero transmission power for CSI-RS transmission.

According to the second embodiment of the present invention, when a total of n CSI-RS patterns have been defined, the number of muting patterns that can be configured by the BS is (n(n+1)/2), including the case in which no CSI-RS pattern is muted. The BS may signal a muted CSI-RS to the UE by transmitting, to the UE, one of the (n(n+1)/2) muting patterns using ceiling $\{\log_2(n(n+1)/2)\}$ bits.

In the case where the BS signals the starting CSI-RS pattern index and the ending CSI-RS pattern index as muting configuration information to the UE as described above, overhead caused by signaling of the muting configuration information may be reduced compared to that of signaling of the bitmap. However, according to the second embodiment, flexibility of the CSI-RS configuration is limited since consecutive CSI-RS patterns should always be configured for channel measurement and/or interference measurement.

Third Embodiment

Number-Based Muting Configuration

In the third embodiment of the present invention, consecutive CSI-RS patterns from among predefined CSI-RS patterns are selected as CSI-RS patterns for channel measurement and/or interference measurement while CSI-RS pattern 0 is always set as a starting CSI-RS pattern. The third embodiment of the present invention is a special case of the second embodiment of the present invention. In this case, the BS may transmit information indicating an ending CSI-RS pattern or information indicating the number of CSI-RS patterns that are muted as muting configuration information to the UE.

Figure 7:
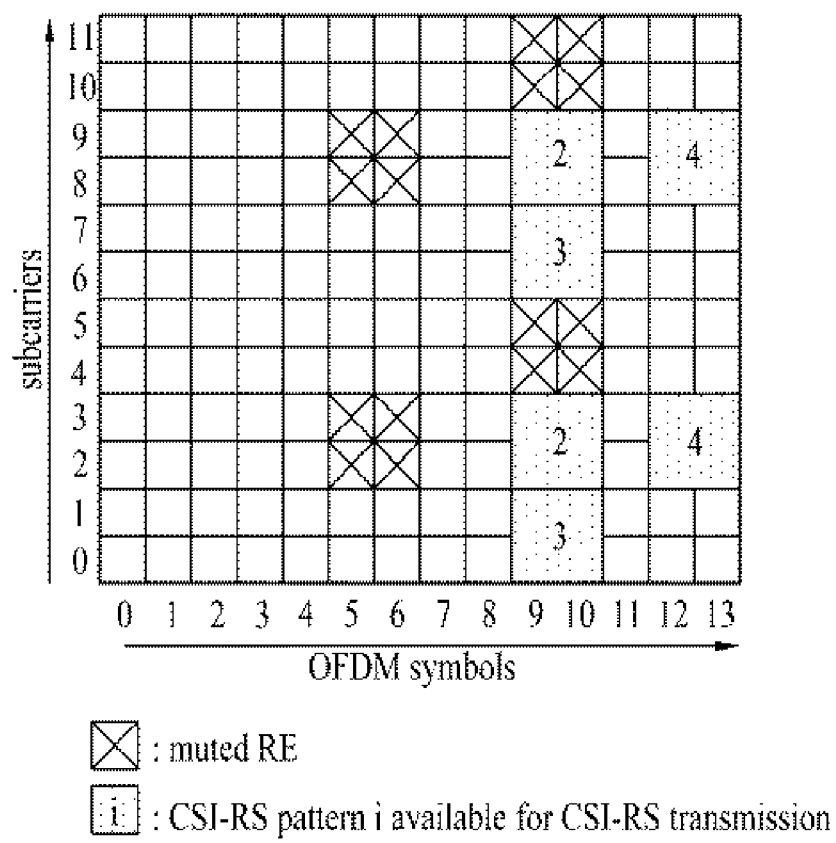
FIG. 7 illustrates resource muting and a muting configuration information according to the third embodiment of the present invention.

FIG. 7 illustrates resource muting and muting configuration information according to the third embodiment of the present invention.

The BS may configure resource muting so as to mute two CSI-RS patterns, starting from the CSI-RS pattern 0. The BS may transmit information indicating that the number of CSI-RS patterns to be muted is 2 as muting configuration information to the corresponding coverage.

A UE located in the coverage may receive the muting configuration information and determine from the received muting configuration information that the BS does not transmit a downlink signal through the two CSI-RS patterns including the CSI-RS pattern 0, i.e., the CSI-RS pattern 0 and the CSI-RS pattern 1. The UE performs rate matching, assuming based on the muting configuration information that the BS transmits no signal through the REs belonging to the range of CSI-RS patterns from the CSI-RS pattern 0 to the CSI-RS pattern 2. Accordingly, the UE excludes a signal received through the CSI-RS pattern 0 and the CSI-RS pattern 2 from a data demodulation procedure.

Figure 8:
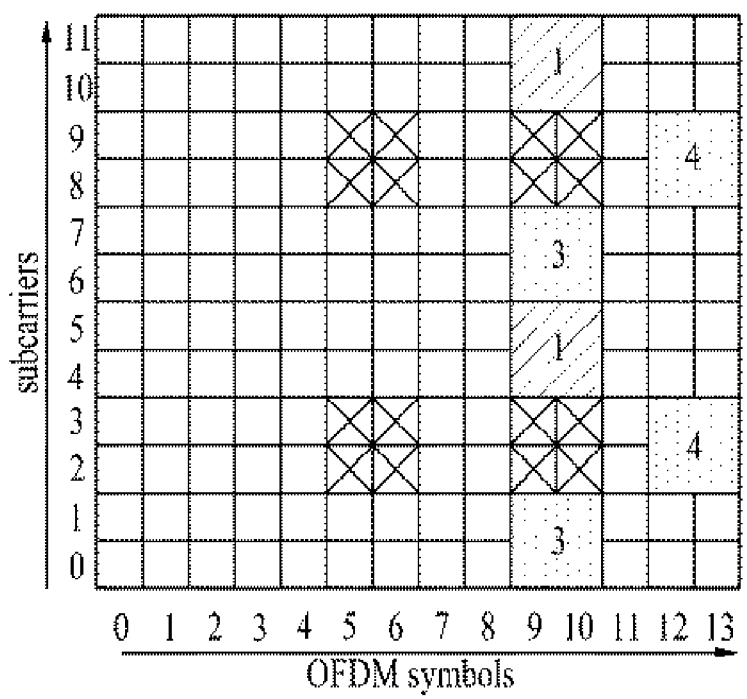
FIG. 8 illustrates another example of resource muting and muting configuration information according to the third embodiment of the present invention.
Figure 8:
Figure 8:
Figure 8:

FIG. 8 illustrates another example of resource muting and muting configuration information according to the third embodiment of the present invention.

A wireless communication system may be configured so as to allow cells belonging to a specific estimation set to use consecutive CSI-RS patterns. In this case, BS(s) that participate in channel measurement and/or interference measurement may configure consecutive CSI-RS patterns starting from the CSI-RS pattern 0 according to the number of cells belonging to the estimation set. The BS may transmit information indicating the number of the configured CSI-RS patterns or information indicating the number of muted CSI-RS patterns as muting configuration information to the corresponding coverage. The BS also transmits CSI-RS pattern information indicating a CSI-RS pattern used for CSI-RS transmission from among the configured configuration CSI-RS patterns.

For example, let us assume that the BS configures consecutive CSI-RS patterns 0, 1, and 2 for channel measurement and/or interference measurement in a geographical region/space managed by the BS while the BS mutes the CSI-RS patterns 0 and 2 and uses the CSI-RS pattern 1 for CSI-RS transmission. In this case, referring to FIG. 8, the BS transmits information indicating the number of CSI-RS patterns muted by the BS or the number of CSI-RS patterns configured by the BS as muting configuration information. In addition, the BS transmits CSI-RS pattern information indicating that the BS performs CSI-RS transmission through the CSI-RS pattern 1 to a UE within the corresponding coverage.

The UE, which has received the muting configuration information and the CSI-RS pattern information, can determine that a signal received through the CSI-RS patterns 0 to 2 is excluded from data through rate matching. Based on the muting configuration information and the CSI-RS pattern information, the UE assumes that no downlink signal is transmitted through the CSI-RS pattern 0 and the CSI-RS pattern 2 and a CSI-RS of the BS is transmitted through the CSI-RS pattern 1. That is, the UE assumes that the BS performs transmission through resources corresponding to the CSI-RS pattern 0 and the CSI-RS pattern 2 with zero transmission power and performs transmission through resources corresponding to the CSI-RS pattern 1 with CSI-RS transmission power.

According to the third embodiment of the present invention, when a total of n CSI-RS patterns have been defined, the BS may transmit the muting configuration information using ceiling $\{\log_2(n)\}$ bits. Accordingly, downlink overhead for muting configuration information may be reduced beyond what was obtained in the second embodiment. However, according to the third embodiment, flexibility of the CSI-RS configuration is more limited than in the second embodiment since consecutive CSI-RS patterns, starting from the CSI-RS pattern 0, should always be configured for channel measurement and/or interference measurement.

Table 1 shows comparison of the number of configurable muting patterns (=the number of RE mapping patterns) and the number of signaling bits of muting configuration information according to the first to third embodiments. From the viewpoint of rate matching, REs belonging to a CSI-RS pattern that the BS uses for CSI-RS transmission should be handled as non-data REs and therefore the number of patterns for rate matching (hereinafter referred to as rate matching patterns) may be defined by the number of CSI-RS patterns. Accordingly, in Table 1, the number of rate matching patterns can be considered the number of available CSI-RS patterns. In Table 1, it is assumed that the number of available CSI-RS patterns for each number of CSI-RS ports is as shown in FIG. 3.

TABLE 1

| Number of CSI-RS ports | Signaling methods | Number of signaling bits | Number of rate matching patterns | Number of RE mapping patterns |
| --- | --- | --- | --- | --- |
| 2 | Bitmap-based | 20 | 20 | 1048575 |
|   | Tree-based | 8 | 20 | 210 |
|   | Number-based | 5 | 20 | 30 |
| 4 | Bitmap-based | 10 | 10 | 1023 |
|   | Tree-based | 6 | 10 | 55 |
|   | Number-based | 4 | 10 | 10 |
| 8 | Bitmap-based | 5 | 5 | 31 |
|   | Tree-based | 4 | 5 | 15 |
|   | Number-based | 3 | 5 | 5 |

From Table 1, it can be seen that the signaling overhead for muting configuration information is highest in the bitmap-based configuration of the first embodiment and is lowest in the number-based configuration of the third embodiment. However, the flexibility in the CSI-RS pattern configuration for channel measurement and/or interference measurement is highest in the first embodiment and is lowest in the third embodiment.

Fourth Embodiment

Group-Based CSI-RS Configuration

In the fourth embodiment of the present invention, CSI-RS patterns are grouped and CSI-RS patterns for channel measurement and/or interference measurement are configured from among CSI-RS patterns of one of the groups.

For example, let us assume that the number of CSI-RS patterns available for CSI-RS transmission through 4 antenna ports is 10 and the number of CSI-RS patterns available for CSI-RS transmission through 8 antenna ports is 5. In this case, CSI-RS pattern indices $\{0, 1, 2, 3, 4, 5, 6, 7, 8, 9\}$ can be used for CSI-RS transmission through the 4 antenna ports and CSI-RS pattern indices $\{0, 1, 2, 3, 4\}$ can be used for CSI-RS transmission through the 8 antenna ports in a subframe.

Table 2 illustrates CSI-RS pattern groups and muting configuration information according to the group-based muting configuration according to the fourth embodiment of the present invention. Specifically, Table 2 shows the case in which the same size of CSI-RS pattern groups are configured regardless of the number of antenna ports. Table 2 is only illustrative and the size of each CSI-RS pattern group and CSI-RS patterns belonging to each group may be defined differently from Table 2.

TABLE 2

| Number of CSI-RS ports | CSI-RS pattern group(s) | Bitmap with CSI-RS group |
| --- | --- | --- |
| 8 | Group 1: $\{0, 1, 2, 3, 4\}$ | 4-bit $\{x, x, x, x\}$, x: 0 or 1 |
| 4 | Group 1: $\{0, 1, 2, 3, 4\}$ Group 2: $\{5, 6, 7, 8, 9\}$ | 4-bit $\{x, x, x, x\}$, x: 0 or 1 |
| 2 | Group 1: $\{0, 1, 2, 3, 4\}$ Group 2: $\{5, 6, 7, 8, 9\}$ Group 3: $\{10, 11, 12, 13, 14\}$ Group 4: $\{15, 16, 17, 18, 19\}$ | 4-bit $\{x, x, x, x\}$, x: 0 or 1 |

In the case where only one CSI-RS pattern group can be used for 8 antenna ports and 2 CSI-RS pattern groups can be used for 4 antenna ports, a muted CSI-RS pattern in a CSI-RS pattern group may be allocated in a bitmap manner. In the case where a CSI-RS pattern group includes N CSI-RS patterns, N−1 bits are needed to indicate which CSI-RS pattern is used for resource muting from among the CSI-RS pattern groups since one of the N CSI-RS patterns is used for CSI-RS transmission of the serving cell. For example, if N is 5, at least 4 bits are needed to indicate a muted CSI-RS pattern in the CSI-RS pattern group.

Referring to Table 2, 2 CSI-RS pattern groups (group 1: $\{0, 1, 2, 3, 4\}$ and group 2: $\{5, 6, 7, 8, 9\}$) can be defined for 4 antenna ports. In this case, if the BS uses the CSI-RS pattern 5 for CSI-RS transmission of the serving cell, the serving cell belongs to the CSI-RS pattern group 2 and the 4-bit bitmap may indicate a CSI-RS pattern that is muted among the remaining CSI-RS patterns 6 to 9. For example, if the 4-bit bitmap indicates $\{0, 0, 1, 1\}$, the 4-bit bitmap may mean that the CSI-RS pattern 8 and the CSI-RS pattern 9 are used for resource muting.

Although Table 2 illustrates the case in which a bitmap-based muting configuration is applied to the group-based muting configuration, the tree-based muting configuration and the number-based muting configuration may also be applied to the group-based muting configuration according to the fourth embodiment of the present invention.

Table 3 illustrates another example of muting configuration information and CSI-RS pattern groups according to the group-based muting configuration according to the fourth embodiment of the present invention. Specifically, in Table 3, different sizes of CSI-RS pattern groups are configured depending on the number of antenna ports. Table 3 is only illustrative and the size of each CSI-RS pattern group and CSI-RS patterns belonging to each group may be defined differently from Table 3.

TABLE 3

| Number of CSI-RS ports | CSI-RS pattern group(s) | Indication of CSI-RS pattern for RE muting within CSI-RS pattern group |
| --- | --- | --- |
| 8 | Group 1: $\{0, 1, 2, 3, 4\}$ | Bitmap/tree/number-based |
| 4 | Group 1: $\{0, 1, 2, 3, 4, 5, 6, 7, 8, 9\}$ | Bitmap/tree/number-based |
| 2 | Group 1: $\{0, 1, 2, 3, 4, 5, 6, 7, 8, 9\}$ Group 2: $\{10, 11, 12, 13, 14, 15, 16, 17, 18, 19\}$ | Bitmap/tree/number-based |

The size of each CSI-RS pattern group may be defined in various manners. For example, the size of each CSI-RS pattern group may be predefined according to the number of antenna ports of the serving cell and may be configured in an upper layer signaling or a broadcast channel.

According to the fourth embodiment of the present invention, it is possible to keep the number of CSI-RS patterns that can be used by a specific cell equal to or less than a desired number since CSI-RS patterns that can be used by the specific cell are limited within a specific CSI-RS pattern group. Thus, according to the fourth embodiment of the present invention, it is possible to keep signaling overhead for muting configuration information transmission equal to or less than a desired level. However, if the size of the CSI-RS pattern group is too small, the flexibility of CSI-RS configuration is reduced since the number of CSI-RS patterns that can be selected by the BS is reduced. On the other hand, if the size of the CSI-RS pattern group is too large, the effect of a reduction in the overhead for muting configuration information signaling may not be very great although the number of combinations of CSI-RS patterns that can be selected by the BS is increased.

Fifth Embodiment

Muting Configuration Based on a Specific Number of Antenna Ports

In the fifth embodiment of the present invention, a CSI-RS pattern is muted based on CSI-RS patterns defined for a specific number of CSI-RS ports regardless of the actual number of antenna ports configured in the BS.

When the fifth embodiment of the present invention is applied, a wireless communication system may be configured such that CSI-RS patterns defined for a large number of CSI-RS ports are used for resource muting. This is because signaling overhead when CSI-RS patterns defined for a large number of CSI-RS ports are used for resource muting is reduced compared to when CSI-RS patterns defined for a small number of CSI-RS ports are used for resource muting.

Figure 9:
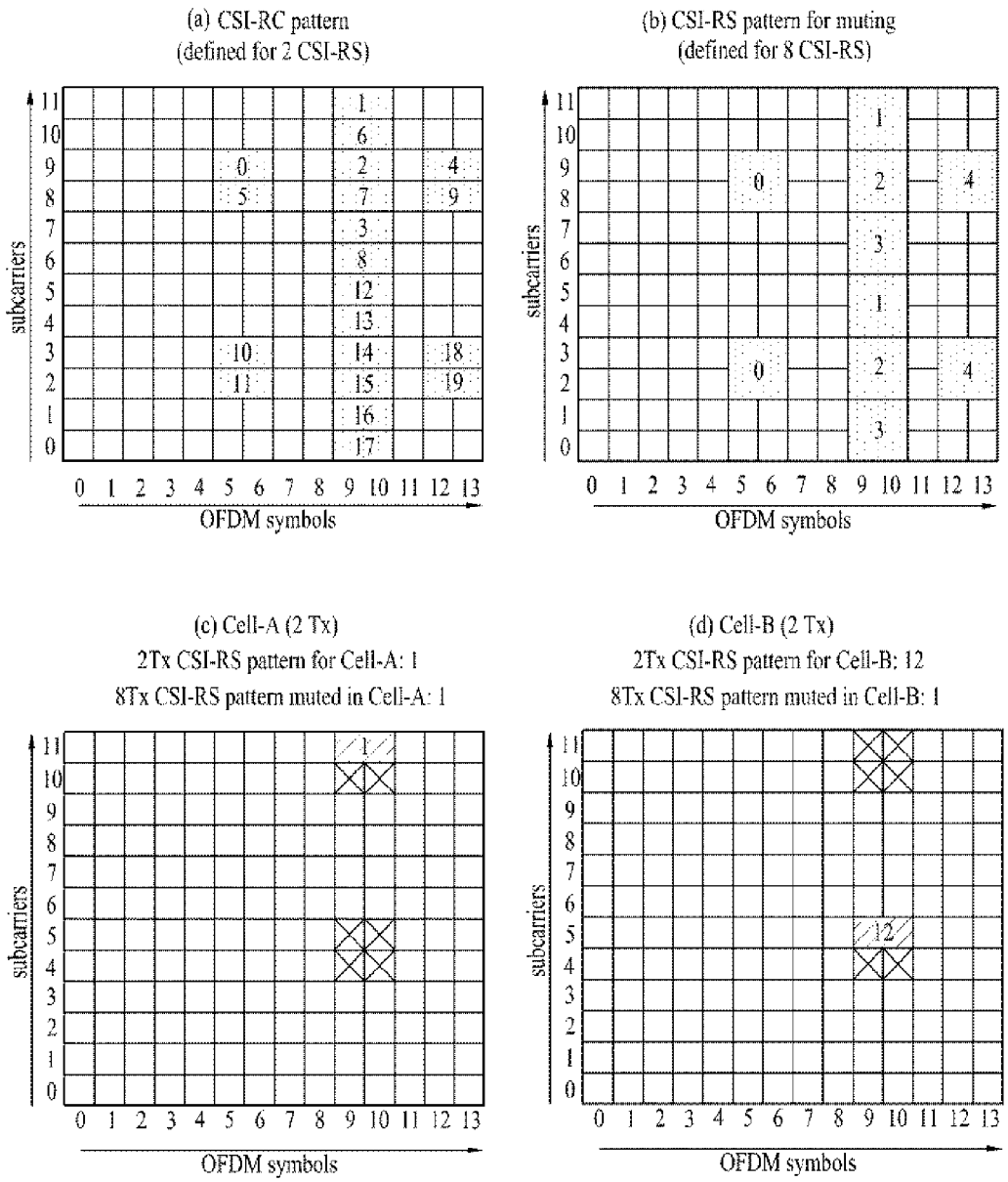
FIGS. 9 to 11 illustrate resource muting and muting configuration information according to the fifth embodiment of the present invention.
Figure 10:
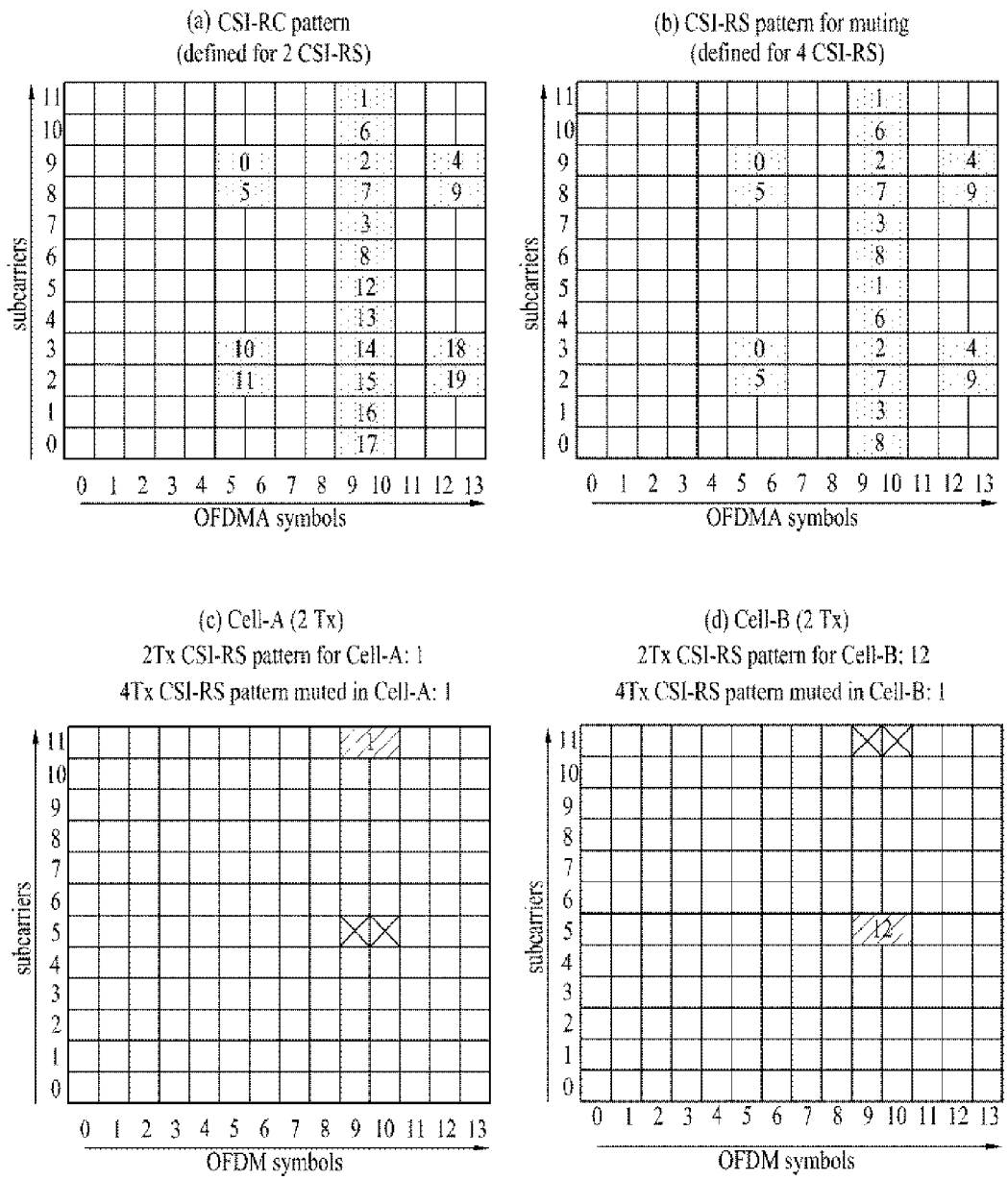
Figure 11:
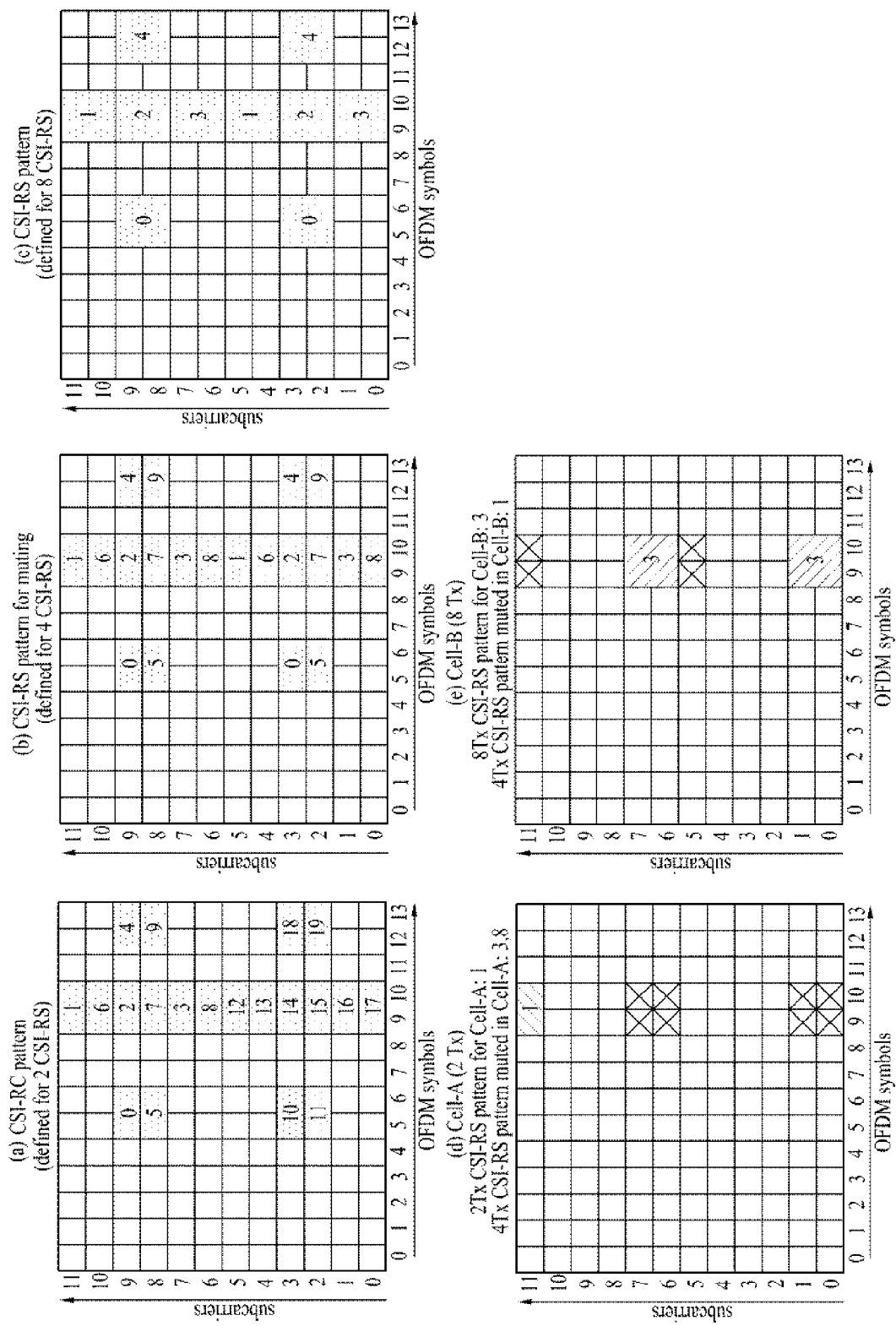

FIGS. 9 to 11 illustrate resource muting and muting configuration information according to the fifth embodiment of the present invention.

Referring to FIG. 9, let us assume that a muting pattern is defined based on CSI-RS patterns defined for 8 CSI-RS ports (hereinafter referred to as 8Tx CSI-RS patterns). When the number of antenna ports of cell A and the number of antenna ports of cell B are each 2, the cell A and the cell B transmit a CSI-RS for each antenna port. That is, the cell A and the cell B each transmit two CSI-RSs. In the case where CSI-RSs are configured such that a CSI-RS of the cell A is transmitted through a 2Tx CSI-RS pattern 1 which is a pattern for 2 CSI-RS transmission of FIG. 9(a) (hereinafter referred to as a 2Tx CSI-RS pattern) and a CSI-RS of the cell B is transmitted through a 2Tx CSI-RS pattern 12 of FIG. 9(a), a BS of the cell B (hereinafter referred to as a BS B) may configure, as a muting pattern, an 8Tx CSI-RS pattern 1 including resources of the 2Tx CSI-RS pattern 1 of FIG. 9(a) configured for CSI-RS transmission of the cell A from among 5 8Tx CSI-RS patterns shown in FIG. 9(b).

The BS B may transmit information indicating that the 2Tx CSI-RS pattern 12 is used for CSI-RS transmission and information indicating that the 8Tx CSI-RS pattern 1 is muted from among the 5 8Tx CSI-RS patterns for the 8 CSI-RS ports to a UE located in the cell B (hereinafter referred to as a UE B). By receiving the information, the UE B may determine that the BS does not transmit a signal through resources other than the resources corresponding to the 2Tx CSI-RS pattern 12 from among resources corresponding to the 8Tx CSI-RS pattern 1.

If, for 2 CSI-RS ports and 4 CSI-RS ports, resource muting is configured based on CSI-RS patterns defined for 8 CSI-RS ports, i.e., based on 8Tx CSI-RS patterns defined for 8 CSI-RS transmission in the above manner, signaling overhead is not substantial even when muting configuration information is transmitted according to the first embodiment which has the highest transmission overhead of muting configuration information among the first to third embodiments. Referring to FIG. 9(b), it is possible to indicate a CSI-RS pattern(s) muted through a 5-bit bitmap since the number of CSI-RS patterns available for resource muting is 5.

However, in the case in which the number of CSI-RS ports of each cell in the estimation set is less than 8, muting overhead is increased since resources that are not actually used for CSI-RS transmission are also muted. Since the muted resources are not used for data transmission, this leads to a loss in the system throughput. However, in the present invention, a CSI-RS is not transmitted in every subframe but instead a CSI-RS is transmitted at intervals of a predetermined duty cycle corresponding to a plurality of subframes. That is, overhead for CSI-RS transmission is small since a CSI-RS is transmitted only in subframes, which are at intervals of the predetermined transmission period, rather than be transmitted in every subframe. Generally, the wireless communication system handles a control signal as being more important than a data signal. If the UE has failed to correctly receive a control signal, the UE cannot properly perform rate matching until the BS retransmits the control signal to the UE. This leads to delay or failure of data demodulation. Accordingly, a control signal is generally transmitted at a coding rate lower than that of a data signal. Therefore, transmission of an amount of control signal requires a greater amount of radio resources than transmission of the same amount of data signal. On the other hand, even when the UE has failed to correctly receive a data signal, the UE can again receive the data signal. In addition, even when part of a data signal is lost or defective, the data signal is more likely to be properly demodulated using the remaining part than is the control signal. Taking into consideration this fact, it is possible to ignore loss due to resource muting for correct transmission of CSI-RSs of cells belonging to the estimation set.

However, taking into consideration that, currently, there are not many BSs that implement up to 8 transmit antennas, it is possible to configure resource muting based on CSI-RS patterns defined for 4 CSI-RS ports (hereinafter referred to as 4Tx CSI-RS patterns) rather than based on 8Tx CSI-RS patterns which are CSI-RS patterns defined for 8 CSI-RS ports. Referring to FIG. 10, let us assume that a muting pattern is defined based on the 4Tx CSI-RS patterns defined for 4 CSI-RS ports. In addition, similar to FIG. 9, let us assume that the number of antenna ports of each of the cell A and the cell B is 2 and CSI-RS transmission is configured such that a CSI-RS of the cell A is transmitted through a 2Tx CSI-RS pattern 1 of FIG. 10(a) (=the 2Tx CSI-RS pattern 1 of FIG. 9(a)) and a CSI-RS of the cell B is transmitted through a 2Tx CSI-RS pattern 12 of FIG. 10(a) (=the 2Tx CSI-RS pattern 12 of FIG. 9(a)). In this case, the BS B can configure, as a muting pattern, a 4Tx CSI-RS pattern 1 including resources of the 2Tx CSI-RS pattern 1 configured for CSI-RS transmission of the cell A from among the 10 4Tx CSI-RS patterns of FIG. 10(b). In the case of FIG. 10, the BS B may mute only 2 REs for each predetermined resource region for CSI-RS transmission of the cell A. Muting overhead of the embodiment of FIG. 10 is less than that of the embodiment of FIG. 9 since the BS B mutes 6 REs for each predetermined resource region for CSI-RS transmission of the cell A. That is, in the case where resources are muted based on the 4Tx CSI-RS patterns defined for the 4 CSI-RS ports, the muting overhead is reduced compared to when resources are muted based on the 8Tx CSI-RS patterns defined for the 8 CSI-RS ports although the number of bits required for signaling of muting configuration information is increased.

In another example, referring to FIG. 11, a muting pattern is defined based on 4Tx CSI-RS patterns defined for 4 CSI-RS ports, similar to FIG. 10. However, in FIG. 11, it is assumed that the number of CSI-RS ports of the cell A is 2 and the number of CSI-RS ports of the cell B is 8 and CSI-RSs of the cell A is transmitted through a 2Tx CSI-RS pattern 1 of FIG. 11(a) (=the 2Tx CSI-RS pattern 1 of FIG. 10(a) and FIG. 9(a)) and CSI-RSs of the cell B is transmitted through an 8Tx CSI-RS pattern 3 of FIG. 11(c). In this case, through the 2Tx CSI-RS pattern 1 of FIG. 11(a), the BS A transmits CSI-RSs for channel measurement of the cell A. The BS A sets, to zero, transmission power of resources belonging to the 4Tx CSI-RS patterns 3 and 8 of FIG. 11(b) corresponding to the 8Tx CSI-RS pattern 3 of FIG. 11(c) that the BS B uses for CSI-RS transmission. That is, the BS A mutes the 4Tx CSI-RS patterns 3 and 8 of FIG. 11(b). The BS B transmits 8 CSI-RSs for channel measurement of the cell B through the 8Tx CSI-RS pattern 3 of FIG. 11(c). Since the 2Tx CSI-RS pattern 1 of FIG. 11(a) that the BS A uses for CSI-RS transmission is in an inclusion relationship with the 4Tx CSI-RS pattern 1 of FIG. 11(b), the BS B sets transmission power of resources belonging to the 4Tx CSI-RS pattern 1 of FIG. 11(b) to zero. That is, the BS B mutes not only resources of subcarrier index 11 and OFDM symbol indices 9 and 10 but also resources of subcarrier index 5 and OFDM symbol indices 9 and 10 even when only resources of subcarrier index 11 and OFDM symbol indices 9 and 10 among the resources of a resource region including 12 subcarriers and 14 OFDM symbols are used for CSI-RS transmission by the BS A.

Taking into consideration that CSI-RS patterns are defined for each number of CSI-RS ports, information indicating the number of CSI-RS ports for which CSI-RS patterns used for a muting pattern have been defined needs to be also transmitted to the UE in order to specify the muting pattern in the first to fourth embodiments. On the other hand, in the fifth embodiment, the number of antenna ports used as a reference for resource muting does not need to be separately signaled since CSI-RS patterns defined for a specific number of antenna ports are used for resource muting. Accordingly, according to the fifth embodiment, transmission overhead of muting configuration information may be reduced compared to the first to third embodiments. In addition, according to the fifth embodiment, the BS can select a CSI-RS pattern required for CSI-RS transmission of a specific cell from among all CSI-RS patterns defined for a number of antenna ports corresponding to the specific cell unless the CSI-RS pattern does not overlap with CSI-RS patterns of another cell. Thus, according to the fifth embodiment, the BS can configure resource muting and CSI-RS transmission with high flexibility and considerable freedom.

The fifth embodiment may be used in combination with one of the first to third embodiments. For example, referring to FIG. 10, the BS A may signal the fact that the 4Tx CSI-RS pattern 1 is muted to a UE located in the cell A by setting, to "1", a bit corresponding to the CSI-RS pattern 1 in the bitmap of 10 bits which are in one-to-one correspondence with 10 4Tx CSI-RS patterns defined for 4 CSI-RS ports.

In another example, referring to FIG. 11, the BS A may transmit, to the UE A, a bitmap of "0010000100" configured by setting, to "1", bits corresponding to the CSI-RS patterns 3 and 8 among 10 bits which are in one-to-one correspondence with 10 4Tx CSI-RS patterns defined for 4 CSI-RS ports. The BS B may transmit, to the UE B, a bitmap of "0010000000" configured by setting, to "1", a bit corresponding to the CSI-RS pattern 1. In the case where the UE has received a bitmap set to "0010000100", the UE may receive a downlink transmission signal, assuming that transmission power for resources corresponding to the CSI-RS patterns 3 and 8 among 10 4Tx CSI-RS patterns of FIG. 11(b) is zero. In the case where the UE has been set to "0100000000", the UE assumes that transmission power for resources corresponding to the 10 4Tx CSI-RS patterns 1 of FIG. 11(b) is zero.

<CSI-RS Configuration Signaling and Muting Pattern Signaling>

CSI-RS patterns of a cell are cell-specific parameters and are used in a static manner without change once the CSI-RS patterns are allocated to the cell. On the other hand, resource muting is used only when the UE is a specific situation such as a multi-cell transmission mode (for example, a Coordinate Multi-Point (CoMP)). Accordingly, resource muting needs to be able to be turned on/off according to the situation. Taking into consideration this situation, to reduce the complexity of UE implementation, a CSI-RS configuration may be transmitted through a broadcast channel (for example, a Maser Information Block (MIB), System Information Block 1 (SIB-1), or System Information Block 2 (SIB-2)) such that the UE does not need to continue monitoring the CSI-RS pattern index of the serving cell once the UE acquires the CSI-RS pattern index of the serving cell. However, CSI-RS patterns that are muted in the serving cell may be turned on/off and may also be changed in the time domain. Accordingly, it may be more desirable that information indicating CSI-RS patterns that are muted be transmitted to the UE through higher layer signaling or RRC signaling so as to allow the BS to configure the CSI-RS patterns that are muted.

Figure 12:
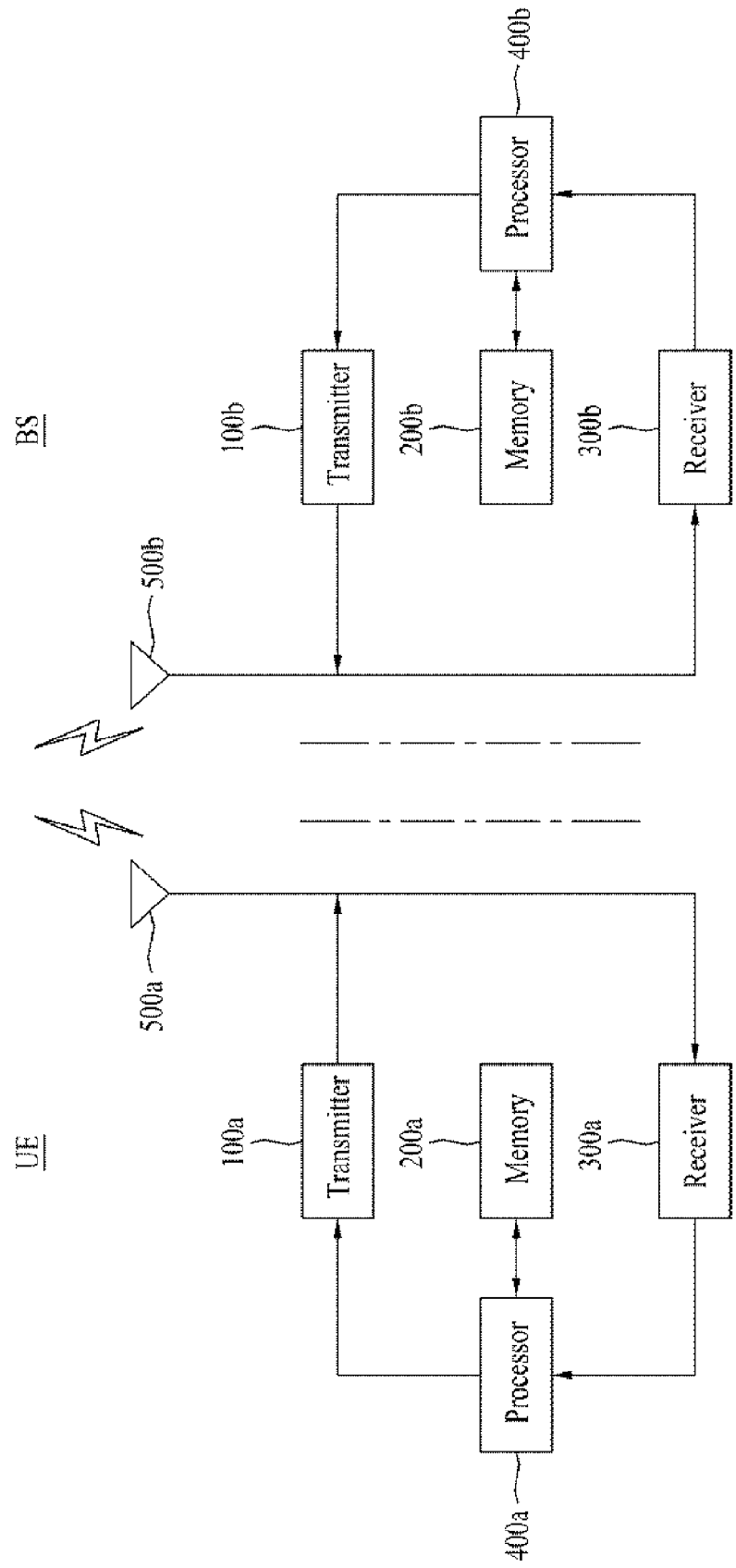
FIG. 12 is a block diagram of a UE and a BS for implementing the present invention.

FIG. 12 is a block diagram of a UE and a BS for implementing the present invention.

The UE operates as a transmitting device in uplink and operates as a receiving device in downlink. On the other hand, the BS may operate as a receiving device in uplink and may operate as a transmitting device in downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing various information associated with communication in the wireless communication system, respectively. The UE and the BS further include processors 400a and 400b, respectively, which are configured to perform the present invention by controlling the components of the UE and the BS such as the transmitters 100a and 100b, the receivers 300a and 300b, and the memories 200a and 200b. The transmitter 100a, the memory 200a, the receiver 300a, and the processor 400a in the UE may be configured as independent components on separate chips or two or more components in the UE may be implemented through a single chip. Similarly, the transmitter 100b, the memory 200b, the receiver 300b, and the processor 400b in the BS may be configured as independent components on separate chips or two or more components in the BS may be implemented through a single chip. The transmitter and the receiver may also be configured as a single transceiver in the UE or the BS.

The antennas 500a and 500b transmit signals generated by the transmitters 100a and 100b to the outside, or transfer radio signals received from the outside to the receivers 300a and 300b. The antennas 500a and 500b may also be referred as antenna ports. Each antenna port may correspond to one physical antenna or may be configured as a combination of two or more physical antenna elements. A signal transmitted from each antenna port cannot be further deconstructed by the receiver 300a of the UE. A reference signal transmitted in association with a corresponding antenna port defines the corresponding antenna port from the viewpoint of the UE and enables the UE to perform channel estimation for the antenna port, regardless of whether or not the channel is a single radio channel from one physical antenna or a composite channel from a plurality of physical antenna elements including the antenna port. That is, in the present invention, the antenna port is defined such that a channel for transmitting a symbol on the antenna port can be derived from the channel through which a different symbol on the same antenna port is transmitted. In the case where the transmitters 100a and 100b and/or the receivers 300a and 300b support a Multiple Input Multiple Output (MIMO) function which transmits and receives data using a plurality of antennas, each of the transmitters 100a and 100b and/or the receivers 300a and 300b may be connected to two or more antennas.

The processors 400a and 400b generally control overall operations of the modules of the UE and the BS. Especially, the processors 400a and 400b may carry out various control functions for performing the present invention, a Medium Access Control (MAC) frame variable control function according to service characteristics and radio environments, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured by hardware, firmware, software, or a combination thereof. In the case where the present invention is implemented by hardware, the processors 400a and 400b may include Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs) configured to implement the present invention. In the case where the present invention is implemented by firmware or software, firmware or software may be configured so as to include a module, a procedure, a function, etc., for performing functions or operations of the present invention. This firmware or software configured to perform the present invention may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the resulting signals and/or data to the antennas 500a and 500b. For example, the transmitters 100a and 100b convert a data stream, which is to be transmitted, into K layers through demultiplexing, channel coding, modulation, etc. The K layers are transmitted through the antennas 500a and 500b via transmission processors in the transmitters 100a and 100b. The transmitters 100a and 100b and the receivers 300a and 300b of the UE and the BS may be configured in different manners depending on the procedures of processing transmitted and received signals.

The memories 200a and 200b may store programs required for processing and control of the processors 400a and 400b and may temporarily store input and output information. Each of the memories 200a and 200b may be implemented using a flash memory-type storage medium, a hard disk-type storage medium, a multimedia card micro-type storage medium, a card-type memory (e.g. a Secure Digital (SD) or eXtreme Digital (XS) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, or the like.

The BS processor 400b according to the embodiments of the present invention may configure CSI-RS subframes and CSI-RS patterns. The BS processor 400b may generate information indicating the configured CSI-RS subframes, i.e., CSI-RS subframe configuration information. The BS processor 400b may generate information indicating a CSI-RS subframe in a radio frame and a CSI-RS transmission period as the CSI-RS subframe configuration information. The BS processor 400b may control the BS transmitter 100b so as to transmit the CSI-RS subframe configuration information. The BS processor 400b may generate information indicating the configured CSI-RS pattern, i.e., CSI-RS pattern information. The BS processor 400b may generate a CSI-RS pattern index corresponding to the configured CSI-RS pattern as the CSI-RS pattern information. The BS processor 400b may control the BS transmitter 100b so as to transmit the CSI-RS pattern information. The BS processor 400b may generate information indicating the number of antenna ports for CSI-RS transmission, i.e., information indicating the number of CSI-RS ports, as the CSI-RS pattern information and control the BS transmitter 100b to transmit the number-of-CSI-RS-ports information to the UE. The BS processor 400b controls the BS transmitter 100b so as to transmit a CSI-RS(s) according to the CSI-RS pattern in the CSI-RS subframe. In this case, each CSI-RS port of the BS transmits a corresponding CSI-RS through a CSI-RS RE for the CSI-RS port in the CSI-RS pattern.

One or more CSI-RS ports may be configured for a given cell. A BS of the serving cell (hereinafter referred to as a serving BS) may configure one or more CSI-RS ports for channel measurement of the serving cell and may transmit one or more CSI-RSs through the one or more CSI-RS ports according to a CSI-RS pattern. For example, referring to FIG. 10(c), a BS (hereinafter referred to as a BS A) to which a cell A belongs may configure 2 CSI-RS ports and may transmit, to a UE located in the cell A, 2 CSI-RSs on the 2Tx CSI-RS pattern 1 through the 2 CSI-RS ports.

In the case where an adjacent cell upon which the serving cell has a great influence or which has a great influence upon the serving cell is present, the serving BS may mute a downlink signal on REs belonging to a CSI-RS pattern that the adjacent cell uses for CSI-RS transmission. For example, referring to FIGS. 10(c) and 10(d), in the case where a cell B which uses a 2Tx CSI-RS pattern 12 for CSI-RS transmission is present adjacent to the cell A, CSI-RS ports of the BS A may transmit CSI-RSs on REs belonging to the 2Tx CSI-RS pattern 1 and transmit no signal on REs belonging to the 2Tx CSI-RS pattern 12.

The serving BS may transmit information indicating a CSI-RS pattern in which signals of the serving cell are muted to the UE according to one of the above embodiments of the present invention. However, resource muting may not be configured in the case where only an adjacent cell upon which the serving cell has little influence or which has little influence upon the serving cell is present.

Resource muting may be configured according to a specific period, similar to CSI-RS transmission. That is, resources corresponding to a CSI-RS pattern configured for muting may be muted only in a subframe corresponding to the specific period rather than be muted in every subframe. Resource muting is generally configured to increase CSI-RS transmission efficiency and, taking into consideration the fact that resource muting is accompanied by loss of data throughput, it is desirable that a CSI-RS pattern be muted only in a specific subframe rather than being muted in every subframe.

The muting subframe including the muted CSI-RS pattern and the resource muting period may be configured equal to or different from the CSI-RS subframe. When the muting subframe is identical to the CSI-RS subframe, the BS may not separately transmit information specifying the muting subframe to the UE. When the CSI-RS subframe and the muting subframe are configured independent of each other, the BS may separately configure information specifying the CSI-RS subframe configured for CSI-RS transmission of the serving cell and information specifying the subframe in which muting is configured and transmit the configured information to the UE.

The BS processor 400b according to the embodiments of the present invention may configure a subframe for resource muting. The BS processor 400b may generate information indicating the configured muting subframe, i.e., muting subframe configuration information. The BS processor 400b may control the BS transmitter 100b to transmit the muting subframe configuration information.

The BS processor 400b may configure a CSI-RS pattern for resource muting according to an embodiment of the present invention.

For example, the BS processor 400b configured according to the fifth embodiment may configure resource muting based on CSI-RS patterns configured for a specific number of antenna ports regardless of the number of antenna ports provided to the BS. Referring to FIG. 10, the BS processor 400b of the fifth embodiment may configure resource muting using 4Tx CSI-RS patterns defined for 4 CSI-RS ports regardless of CSI-RS ports of the corresponding cell. That is, the BS processor 400b configured according to the embodiment of FIG. 10 always configures resource muting in units of 4Tx CSI-RS patterns even when the number of CSI-RS ports of the corresponding cell is 2 or 8. In another example, the BS processor 400b configured according to the second embodiment may configure one or more consecutive CSI-RS patterns among n available CSI-RS patterns as CSI-RS patterns for resource muting.

The BS processor 400b may generate information indicating CSI-RS patterns configured for muting, i.e., muting configuration information, according to an embodiment of the present invention. For example, referring to FIG. 10, the processor of the BS A may generate a bitmap of 10 bits set to "0100000000" according to the first and fifth embodiments. Here, it is assumed that the Most Significant Bit (MSB) corresponds to the minimum CSI-RS pattern index among the 10 CSI-RS pattern indices and subsequent bits in the bitmap correspond respectively to CSI-RS patterns in increasing order. In another example, referring to FIG. 6, the BS processor 400b configured according to the second embodiment may generate muting pattern indices corresponding to the starting CSI-RS pattern 1 and the ending CSI-RS pattern 3 as muting configuration information.

The BS processor 400b may control the BS transmitter 100b so as to transmit the muting configuration information. The BS processor 400b may control the BS transmitter 100b so as to mute REs belonging to the muted CSI-RS pattern in the muting subframe. That is, the BS processor 400b may control the BS transmitter 100b such that transmission power of REs belonging to the muted CSI-RS pattern in the muting subframe is 0. In this case, each transmit antenna 500b of the BS transmits a signal with zero transmission power through REs belonging to the muted CSI-RS pattern in the muting subframe. However, when a CSI-RS resource used for CSI-RS transmission of the corresponding cell is present among resources belonging to the muted CSI-RS pattern, the BS processor 400b does not mute the CSI-RS resource.

The UE receiver 300a receives the muting configuration information from the BS and transfers the muting configuration information to the UE processor 400a. The UE processor 400a may identify a corresponding resource in a specific resource region based on the muting configuration information. For example, in the case in which a CSI-RS pattern is defined in a resource region including 12 subcarriers and 14 OFDM symbols, the UE processor 400a may determine a resource in which the BS does not perform downlink transmission in the resource region based on the muting configuration information. For example, let us assume that a muted CSI-RS pattern is configured according to the fifth embodiment of the present invention and the muted CSI-RS pattern is indicated according to the second embodiment. Referring to FIG. 10, in the case where a UE belonging to the cell A (hereinafter referred to a UE A) receives a bitmap of 10 bits set to "0100000000" from the BS A, the processor 400a of the UE A may determine that signals transmitted by the BS are not present in resources corresponding to the 4Tx CSI-RS pattern 1 among the 4Tx CSI-RS patterns of FIG. 10(b). However, since the resources corresponding to the 2Tx CSI-RS pattern 1 among resources corresponding to the 4Tx CSI-RS pattern 1 are used for CSI-RS transmission of the cell A, the processor 400a of the UE A does not determine that such transmitted signals are absent in resources corresponding to the 2Tx CSI-RS pattern 1 of FIG. 10(a). Rather, the processor 400a of the UE A may perform channel measurement using a transmitted signal in resources corresponding to the 2Tx CSI-RS pattern 1 of FIG. 10(a). The processor of the UE A may determine that REs corresponding to CSI-RS patterns corresponding to the bits set to "0" are data REs if there is no other specific reason (for example, unless the resources are resources used for transmission of a reference signal such as transmission of a synchronous signal of the BS A and/or a CSI-RS/CRS/DRS by the BS A)

The UE processor 400a may calculate channel state information from a channel measurement result and/or an interference measurement result and control the UE transmitter 100a to feed the channel state information back to the BS.

Although the embodiments of the present invention have been described with reference to downlink transmission as an example, the embodiments may be applied to uplink transmission in the same manner. In the case where the embodiments of the present invention are applied to uplink transmission, the operations performed by the BS in the above embodiments may be performed by the UE and the operations performed by the UE in the above embodiments may be performed by the BS.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention may be used for a BS, a UE, and various other equipment in a wireless communication system.

The invention claimed is:
1. A method for transmitting a downlink signal from a base station in a wireless communication system in which resource sets for channel measurement include a first resource sets for a non-zero transmission power region and a second resource sets for a zero transmission power region, the method comprising:
    transmitting resource information indicating the zero transmission power region to a User Equipment (UE); and performing downlink transmission to the UE based on the resource information, wherein the first resource sets for the non-zero transmission power region are defined according to a number of antenna ports configured for transmission of channel measurement reference signal, wherein the second resource sets for the zero transmission power region are defined according to a predetermined number of antenna ports, regardless of the number of antenna ports configured for transmission of the channel measurement reference signal, and wherein the predetermined number is greater than 1.

2. The method of claim 1, wherein the predetermined number corresponds to a fixed number.

3. The method of claim 2, wherein the resource information includes information indicating at least one resource set within the second resource sets.

4. The method of claim 2, wherein:

the resource information includes a plurality of bits corresponding respectively to the second resource sets;

a bit of the plurality of bits that corresponds to a second resource set included in the zero transmission power region is set to a first value; and a bit of the plurality of bits that corresponds to a second resource set that is not included in the zero transmission power region is set to a second value.

5. A method for receiving a downlink signal by a User Equipment (UE) in a wireless communication system in which resource sets for a reference signal for channel measurement include first resource sets for a non-zero transmission power region and second resource sets for a zero transmission power region, the method comprising:

receiving resource information indicating the zero transmission power region; and receiving a downlink transmission based on the resource information, wherein the first resource sets for the non-zero transmission power region are defined according to a number of antenna ports configured for transmission of channel measurement reference signal, wherein the second resource sets for the zero transmission power region are defined according to a predetermined number of antenna ports, regardless of a number of antenna ports configured for transmission of the channel measurement reference signal, and wherein the predetermined number is greater than 1.

6. The method of claim 5, wherein:

the resource sets defined in the wireless communication system include at least first resource sets for N1 antenna ports and second resource sets for N2 antenna ports, where N2>N1; and the plurality of resource sets for the specific number of antenna ports is the second resource sets.

7. The method of claim 6, wherein the resource information includes information indicating the at least one resource set within the second resource sets.

8. The method of claim 6, wherein:

the resource information includes a plurality of bits corresponding respectively to the second resource sets; and the UE assumes that a second resource set corresponding to a bit of the plurality of bits, that is set to a first value, among the second resource sets is included in the zero transmission power region.

9. A base station for transmitting a downlink signal in a wireless communication system in which resource sets for channel measurement include first resource sets for a non-zero transmission power region and second resource sets for a zero transmission power region, the base station comprising:

a transmitter; and a processor electrically connected to the transmitter and configured to control the transmitter to:

transmit resource information indicating the zero transmission power region configured to a User Equipment (UE); and perform downlink transmission to the UE based on the resource information, wherein the first resource sets for the non-zero transmission power region are defined according to a number of antenna ports configured for transmission of channel measurement reference signal, wherein the second resource sets for the zero transmission power region are defined according to a predetermined number of antenna ports, regardless of a number of antenna ports configured for transmission of the reference signal for channel measurement, and wherein the predetermined number is greater than 1.

10. The base station of claim 9, wherein the predetermined number corresponds to a fixed number.

11. The base station of claim 10, wherein the resource information includes information indicating the at least one resource set within the second resource sets.

12. A User Equipment (UE) for receiving a downlink signal in a wireless communication system in which resource sets for a reference signal for channel measurement include first resource sets for a non-zero transmission power region and second resource sets for a zero transmission power region, the UE comprising:

a receiver; and a processor electrically connected to the receiver and configured to:

control the receiver to:

control the receiver to receive resource information indicating the zero transmission power region; and receive a downlink transmission based on the resource information, wherein the first resource sets for the non-zero transmission power region are defined according to a number of antenna ports configured for transmission of channel measurement reference signal, wherein the second resource sets for the zero transmission power region are defined according to a predetermined number of antenna ports, regardless of a number of antenna ports configured for transmission of the reference signal for channel measurement, and wherein the predetermined number is greater than 1.

13. The UE of claim 12, wherein the predetermined number corresponds to a fixed number.

14. The UE of claim 13, wherein the resource information includes information indicating the at least one resource set within the second resource sets.

15. The UE of claim 13, wherein:

the resource information includes a plurality of bits corresponding respectively to the second resource sets; and the processor is further configured to assume that a second resource set corresponding to a bit of the plurality of bits, that is set to a first value, among the second resource sets is included in the zero transmission power region.

* * * * *